(12) United States Patent  
Harvey et al.

(10) Patent No.: US 9,204,186 B2
(45) Date of Patent: Dec. 1, 2015

(54) BUFFERING CONTENT

(71) Applicant: COMCAST CABLE COMMUNICATIONS, LLC, Philadelphia, PA (US)

(72) Inventors: John Kirk Harvey, Wynnewood, PA (US); Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 3 days.

(21) Appl. No.: 13/800,106

(22) Filed: Mar. 13, 2013

(65) Prior Publication Data

US 2014/0282759 A1  Sep. 18, 2014

(51) Int. Cl.
H04N 21/43 (2011.01)
H04N 21/433 (2011.01)
H04N 21/426 (2011.01)
H04N 21/45 (2011.01)
H04N 21/466 (2011.01)

(52) U.S. Cl.
CPC ....... *H04N 21/4333* (2013.01); *H04N 21/4263* (2013.01); *H04N 21/4532* (2013.01); *H04N 21/4668* (2013.01)

(58) Field of Classification Search
None
See application file for complete search history.

(56) References Cited

U.S. PATENT DOCUMENTS

| 2002/0194593 A1* | 12/2002 | Tsuchida et al. | 725/32 |
| 2004/0181813 A1* | 9/2004 | Ota et al. | 725/131 |
| 2006/0179462 A1* | 8/2006 | Willame et al. | 725/90 |
| 2009/0235308 A1* | 9/2009 | Ehlers et al. | 725/34 |

* cited by examiner

*Primary Examiner* — Cai Chen
(74) *Attorney, Agent, or Firm* — Banner & Witcoff, Ltd.

(57) ABSTRACT

The disclosure relates generally to buffering and presenting content. Multiple pause buffers may be created and maintained so that users can jump within the content of a channel. If buffered content is not available, the user may be offered similar content that is available as on-demand content, or as other recorded content, for example, stored on a digital video recorder. If a commercial is playing when the new channel is selected, a buffered portion corresponding to an earlier portion of the content may be presented instead of the commercial.

21 Claims, 13 Drawing Sheets

BUFFERING CONTENT

BACKGROUND

Consumption of television programming is an integral part of our culture. Many users consume hours of television each day to watch news reports, sports, game-shows, movies, reality-shows, dramas, etc. While the amount and variety of content available may seem large to some, others still desire more. In addition, the likes and dislikes of users change over time. Thus, there is a demand for an increase in the amount and variety of content available as well as for continuous changes in the content offered. Content creators and content providers continue to strive to meet this demand. As a result, users continue to explore the many content options available by flipping through the channels that carry the content. Unfortunately, users sometimes find that they arrive at a channel at an undesirable time, such as during a commercial break or after a program has begun. Some aspects of the present disclosure relate to content buffering methods that provide options and remedies to users, such as users who find themselves wishing they had arrived at a channel sooner.

SUMMARY

Some of the various features described herein facilitate buffering content and provide buffered content for presentation. Aspects relate to methods, computer-readable media, and systems for leveraging multiple tuners within modern interfaces, such as terminals, computing devices, set top boxes, etc., to buffer content. In one aspect, additional tuners may be used to buffer content carried on other channels, or channels that a user is not currently watching, but that a user might want to watch in the near future. In a case that a user selects a new channel that has been previously buffered, the user may be able to jump back within the content on the newly-selected channel to consume earlier portions that he/she missed. For example, if a user selects a new channel that is currently carrying a commercial, the user may jump back to watch the content before that commercial. This may help a user decide whether he/she wants to stay on the channel or continue searching for other content.

Other aspects relate to methods, computer-readable media, and systems for buffering content upstream and setting up a switched digital video session for users that select a new channel that is at a commercial break. A content transmission session, such as a switched digital video session, may be used to provide buffered portions of the newly-selected content that were broadcasted, or otherwise transmitted, before the user chose the new content or channel. For example, the switched digital video session may provide a portion of the content that was transmitted in the minute preceding the commercial.

In accordance with some aspects of the disclosure, a method for buffering multiple logical channels is disclosed. The method may include a step of creating a first pause buffer for a first piece of content being carried on a first logical channel. Further, a computing device may identify one or more of additional pieces of content being carried on one or more additional logical channels, respectively. User preferences may be used to identify the one or more additional pieces of content. Then, one or more additional pause buffers for the one or more additional pieces of content, respectively, may be created.

Further, other aspects of the disclosure include a method for buffering a plurality of pieces of content at a computing device in a data processing facility, such as a local office. In some cases, the computing device may buffer content on all available channels. The local office may receive a signal from an interface (e.g., a gateway, a set top box) at a remote premises (e.g., a home or another user facility). The signal may indicate a logical channel that is selected by a user at the remote premises. A computing device at the local office may then use or establish a transmission session (e.g., a switched digital video session) for providing a piece of buffered content corresponding to the selected logical channel. The buffered content may be a portion of a piece of content that is broadcasted during a set period of time (e.g., one minute, thirty seconds, etc.) prior to a commercial block. After setting up and presenting buffered content in the transmission session, a number of options for presenting remaining or additional portions of the content are disclosed. The transmission session (e.g., switch digital video session) may continue to provide an entire piece of content or may be terminated and the remaining portions of the content may be watched as regularly transmitted. The remaining portions may also be played back at a faster rate so that the user may catch up without missing the content.

Additionally, other aspects of the present disclosure teach computing devices, having a processor and memory storing computer-executable instructions, and other apparatuses to perform the above steps and other steps for identifying which content to buffer, controlling tuners, analyzing content, and determining user inputs.

Other details and features will also be described in the sections that follow. This summary is not intended to identify critical or essential features of the inventions claimed herein, but instead merely summarizes certain features and variations thereof.

BRIEF DESCRIPTION OF THE DRAWINGS

Some features herein are illustrated by way of example, and not by way of limitation, in the figures of the accompanying drawings in which like reference numerals refer to similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Furthermore, the disclosure of U.S. patent application Ser. No. 13/559,341, filed Jul. 26, 2012 and entitled "Customized Options For Consumption Of Content," is hereby incorporated by reference in its entirety.

By way of introduction, the various features described herein may allow a user to change channels and immediately jump back to earlier portions of the new channel. In particular, users may want to jump back to earlier portions when the channel they have just changed to is at a commercial break. In some cases, commercials can be detected and a user may be automatically presented with buffered portions of the content instead of a commercial.

In some aspects of the disclosure, pause buffers are used. A pause buffer may be a temporary data storage in which data first stored in the buffer is erased after some time to make room for more data. Pause buffers may particularly be used for content and allow for a user to pause content and jump back and forward within the content. A pause buffer may be implemented with a circular, first-in-first-out (FIFO) buffer. Pause buffers may vary in size. The size of a pause buffer may be characterized in terms of length, which may indicate how much time data may remain in the pause buffer. In some cases, a pause buffer may be large enough to record an entire show; however, unlike a recording, a pause buffer eventually automatically removes content to buffer additional content.

Figure 1:
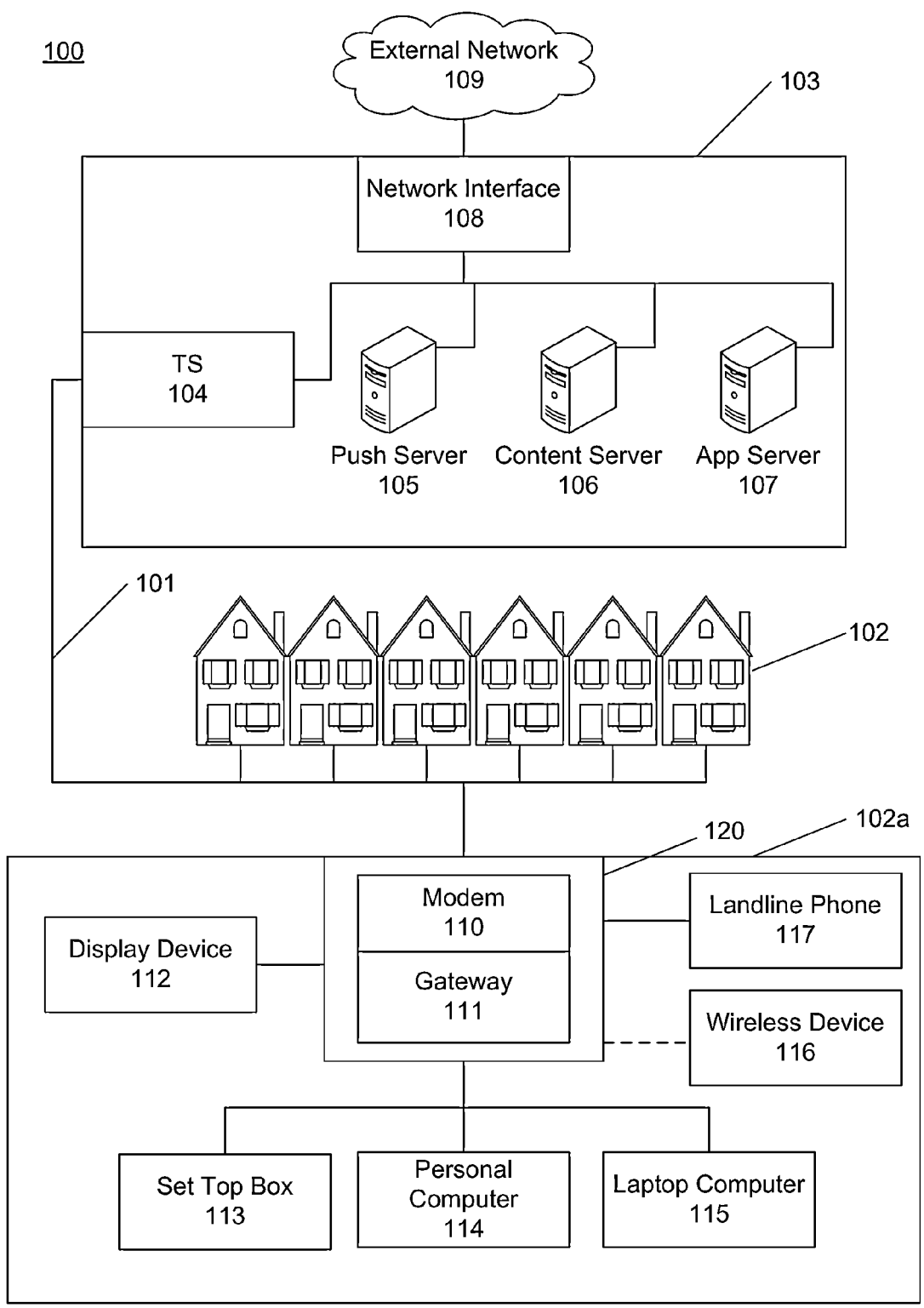
FIG. 1 illustrates an example communication network on which various features described herein may be used.

FIG. 1 illustrates an example communication network 100 on which many of the various features described herein, such as the broadcasting (e.g., transmitting, digitally multicasting, etc.) of content to be buffered and providing of a switched digital video may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data, such as user preferences.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.16), analog twisted pair interfaces, Bluetooth interfaces, and others.

Figure 2:
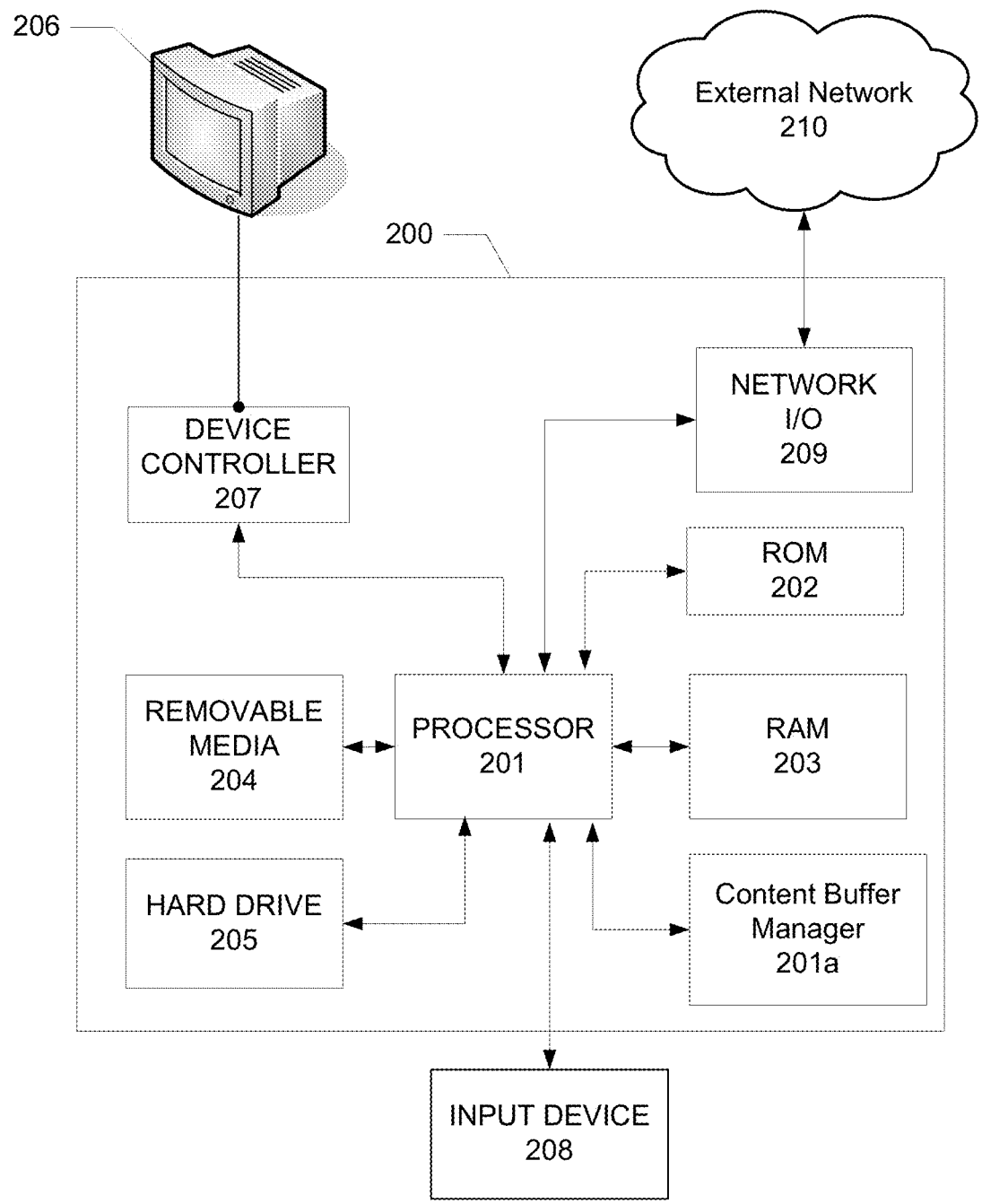
FIG. 2 illustrates an example computing device and software configuration that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is a hardware configuration. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device). Additionally, the computing device 200 may include a content buffer manager 201a, which can perform the various methods for determining which pieces of content to buffer as described herein, as a replacement for, or augment to, any other processor 201 that the computing device 200 may include. That is, the content buffer manager 201a may include a separate processor and/or set of computer-executable instructions stored on a computer-readable medium that, when executed by a processor, cause the processor (or the computing device 200 as a whole) to perform the various methods of the present disclosure, such as updating/monitoring user preferences, determining which pieces of content to buffer, how much of each piece of content should be buffered, when to dump buffered content, etc. The content buffer manager 201a may also include secure memory (not shown), which can store the various user preferences and/or algorithms described herein. The secure memory can be any desired type of memory, and can have enhanced security features to help restrict access (e.g., can only be accessed by the content buffer manager 201a, can be internal to the content buffer manager 201a, etc.). Where the content buffer manager 201a includes a separate set of computer-executable instructions, these instructions may be secured such that only authorized users may be allowed to modify, augment, or delete them.

In some embodiments, the content buffer manager 201a may be implemented as an application specific integrated circuit (ASIC). That is, the content buffer manager 201a may be a chip designed specifically for performing the various processes described herein. Further, the ASIC may be implemented within or in communication with various computing devices provided herein.

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
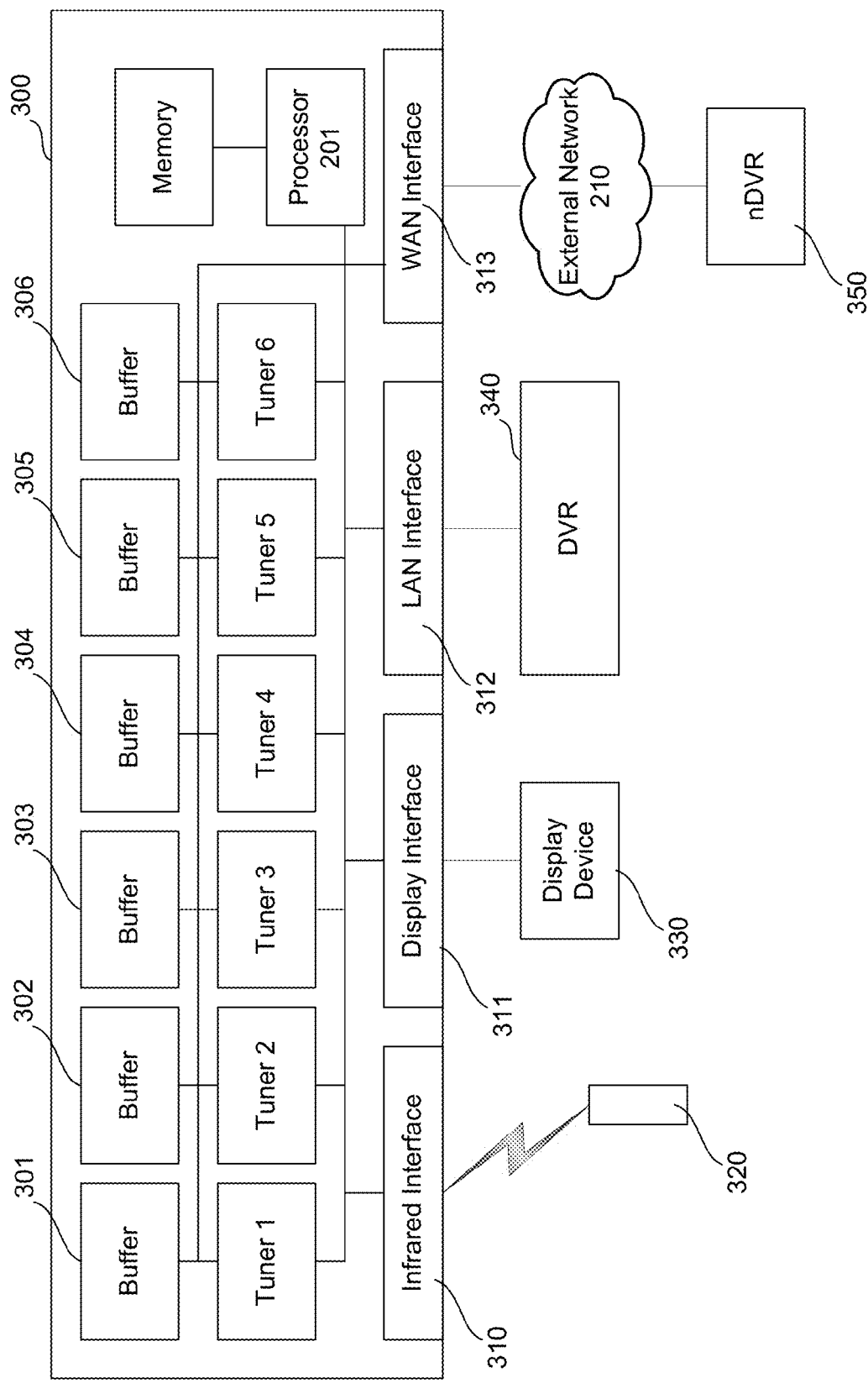
FIG. 3 illustrates an example interface to implement methods and systems described herein.

FIG. 3 is a diagram showing an example configuration of an interface 300 capable of performing various features described herein. The interface 300 may operate as the interface 120 of FIG. 1. The interface 300 may include a plurality of buffers, a plurality of tuners, one or more processors/ASICs, memory storing computer-executable instructions for controlling the one or more processors, a plurality of interfaces and other components (now shown) that may be found in traditional interfaces 120 (e.g., set top boxes). In FIG. 3, the interface has six tuners, and each tuner is shown as having its own buffer. However, in some embodiments, the plurality of tuners may share buffers. The tuners may be controlled to tune to particular frequencies to pick-up particular logical channels (e.g., channel 4) by a processor/ASIC (e.g., processor 201 or 201a) and memory (e.g., ROM 202, RAM 203, etc.). In some embodiments, the tuners may simply be digital decoders that receive a digital stream (which may be initially captured by a separate tuning device) and extract a logical service, such as the video stream for a sports network (e.g., ESPN). The processor and memory may also control whether the tuners should store content on those channels in the buffers 301-306. By storing content on the buffers 301-306, the interface 300 may generate the pause buffers described herein.

Further, the interface 300 may include an infrared interface 310 for receiving infrared signals transmitted by a remote control device 320. For example, the infrared interface 310 may receive an infrared signal indicating a channel change (e.g., channel up/down selection or channel number). The interface 300 may also include a display interface 311 for delivering data to present content through a display device 330 (e.g., television, computer monitor, etc.). In addition, the interface 300 may include a local area network (LAN) interface 312 for communicating with a digital video recorder (DVR) 340. The DVR 340 may be a device that is specially designed and configured to record content (e.g., television programs). Specifically, the DVR 340 may be configured to record multiple pieces of content at a time.

In some cases, the interface 300 might not have (or use) its own buffers for generating pause buffers, and instead, may use buffers of the DVR. That is, the buffers 301-306 may be implemented within the DVR 340 as opposed to the interface 300 itself. Alternatively, although shown as a separate device, the digital video recorder 340 may be incorporated into the interface 300.

Additionally, the interface 300 may include a wide area network (WAN) interface 313 for communicating with other computing devices 200 via the external network 210. In particular, the interface 300 may communicate with a network digital video recorder (nDVR), which may be a server specially designed and configured to record content. The nDVR 350 may perform similar function as the DVR 340, but is accessible via the external network 210.

Figure 4:
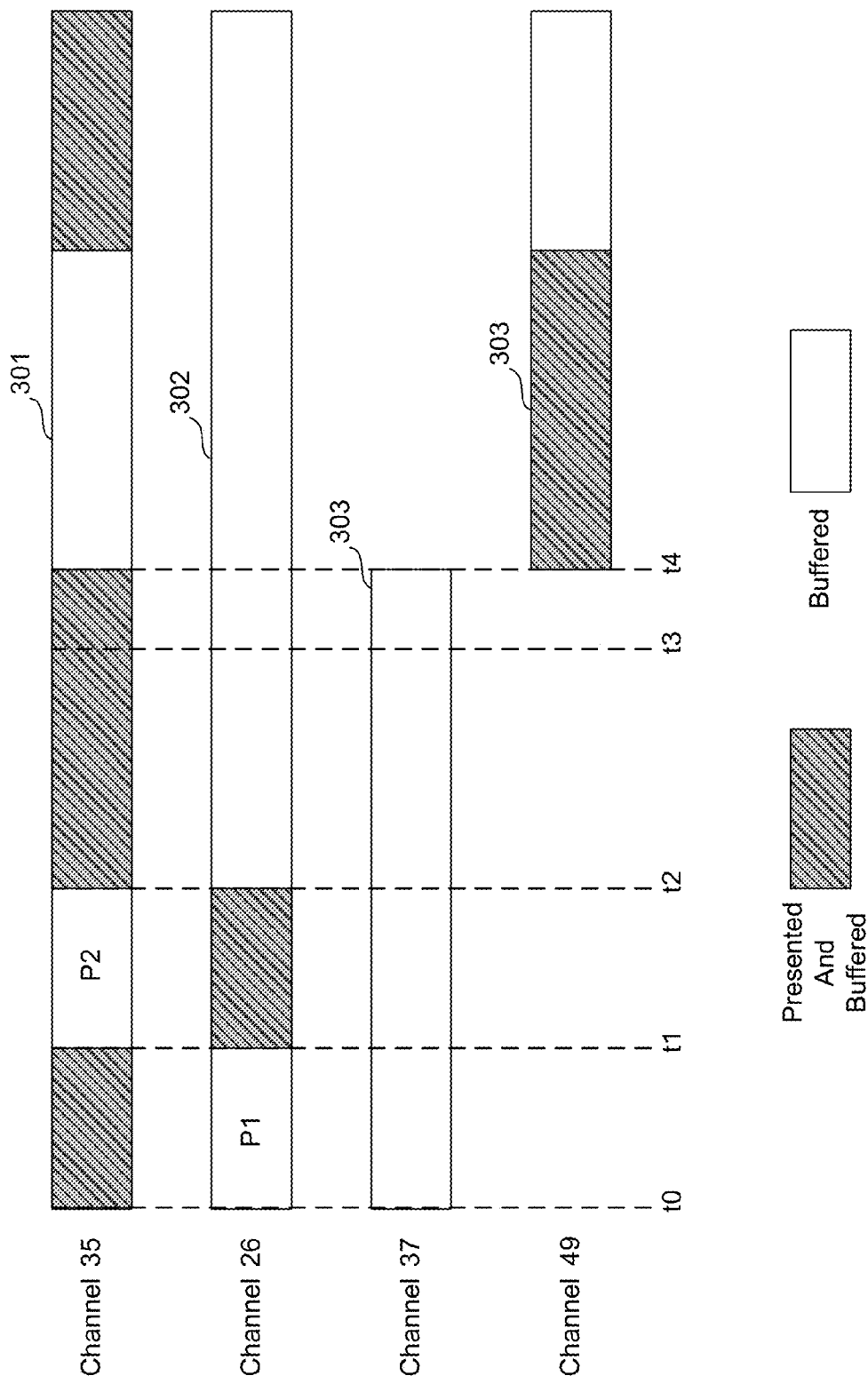
FIG. 4 is a diagram illustrating one or more aspects described herein.

FIG. 4 is a diagram illustrating an example scenario in which content is consumed and buffered. Specifically, FIG. 4 shows how content on separate logical channels may be tuned to, consumed, and buffered by an interface 300 as a user navigates to one or more of the logical channels.

In the scenario of FIG. 4, it is assumed that there are three available tuners and three available buffers for performing pause buffering. At time t0, the three tuners may tune to channels 35, 26, and 37, respectively, and may buffer content on each channel in a corresponding one of the three buffers. The channels may be content services, such as audio/video streams from video program providers, such as ABC, NBC, CBS, ESPN, HBO, etc. These services may be analog or digital and of varying levels of definition (e.g., standard definition, high definition, etc.), and in some embodiments, may be digital streams multiplexed onto an analog frequency range. Also at time t0, a display device (e.g., a television, monitor, etc.) may present the content on channel 35 to the user. As shown, in this scenario, the user continues to consume content on channel 35 until time t1. At that time, the user chooses to change the channel from channel 35 to channel 26. Since the new channel (channel 26) is already being buffered at the time of the change, the interface 300 might not make any changes to the tuners and buffers. That is, the interface 300 may allow the three tuners and buffers to continue to tune to and buffer the content on the same channels.

Notably, since the channel 26 was previously being buffered prior to the channel change at time t1, the user may choose to rewind (e.g., jump back) the content on channel 26 to view an earlier portion. For example, the user may control interface 300 to present content that was buffered by the second buffer 302 during the time period P1 between time t0 and time t1.

At time t2, the user may change the channel back to channel 35. Since content on channel 35 was being buffered by the first buffer 301 while the user was consuming content on channel 26, the user may jump back to watch the content of channel 35 during the time period P2 between time t1 and time t2. Also, although the user has left channel 26, the second buffer 302 may continue to buffer the content on channel 302 in case that the user may return to channel 26.

At time t3, the length of one or more of the pause buffers may be reached. For example, if the length of the second buffer 302 is five (5) minutes and the difference between time t0 and t3 is five (5) minutes, then the length of the second buffer 302 may be reached at time t3. As a result, at time t3, the second buffer 302 may begin to dump (or drop) the content first buffered by the second buffer 302 during the time period P1 between time t0 and time t1. By dumping the content first buffered, the second buffer 302 may free-up memory to buffer content at time t3 and thereafter. In some embodiments, this buffering may be circular, and the buffer may simply record new content by overwriting the oldest content.

In some embodiments, each of the buffers 301-303 may have the same length. This length may be predetermined based on a structural limitation of the buffers 301-303 or based on a user setting that may be adjusted. Alternatively, the length of each buffer 301-303 may depend on the number of tuners being used for pause buffering (or a number of pieces of content being buffered) and an amount of memory available. For example, given a certain amount of memory (which may be designated for pause buffering), if only three tuners are used to fill three buffers, the length of the three buffers may be longer than if six tuners were used to fill six buffers.

In other embodiments, each of the buffers 301-303 may have different lengths. The lengths of the buffers 301-303 may depend on the level of definition of the content being buffered (e.g., whether content is standard definition or high definition). Further, the lengths of the buffers 301-303 may depend on how likely a user is to want to consume content being buffered. Specifically, the lengths of the buffers may be determined based on user preferences. For example, if a user prefers one piece of content over another, the buffer for buffering the preferred piece of content may be given a longer length. Alternatively, preferred channels may be given longer buffer lengths. For example, if a user more commonly consumes content on channel 35 than on channel 26 than the length of the first buffer 301 may be longer than that of the second buffer 302. Preferred content and preferred channels may be determined based on rankings provided by a user. Moreover, preferred content and preferred channels may be learned through studying a user's viewing history or studying a user's future recording schedule, or through a combination of both.

Further, the lengths of the buffers may be adjusted in real-time. The interface 300 may determine to extend one buffer while shortening another buffer based on what content is being consumed or recently has been consumed. In other words, a buffer's length may be adjusted depending on whether the buffer is being used to buffer content that is being consumed (or recently has been consumed). In particular, a buffer that is buffering content, which is also currently being presented to a user, may be assigned a longer length than a buffer that is buffering content that is not being consumed. For example, the first buffer 301 may be given a longer length, so that it may buffer more of the content on channel 35 that is currently being consumed (or recently has been consumed), than the third buffer 303, which is used to buffer content on channel 37 that has not been consumed. As a result, the interface 300 may buffer more of the content that a user may more likely want to rewind.

Still referring to FIG. 4, at time t4, the user may change the channel yet again. This time, the user may select channel 49, which was not yet buffered in this scenario. When an unbuffered channel (e.g., channel 49) is selected, the interface 300 may determine whether or not to begin buffering the new channel's content. The interface 300 may determine that it will not begin buffering the new channel's content if it detects that the user is simply channel surfing and is not likely to stay at this new channel for long. The interface 300 may detect that a user is channel surfing if a user has made a number of channel changes within some threshold period of time. The interface 300 may also presume that the user is channel surfing until the user views content on a channel for at least, e.g., 3 seconds. In determining whether a user is channel surfing, the interface 300 may also take into account whether channel selections are consecutive channels (e.g., the user is pressing a channel up/down button) or whether the channel selections are the result of repeatedly selecting a common input to flip through a predetermined subset of channels. The interface 300 may also determine that it will not begin buffering the content on the new channel if it detects that the content on the new channel is at a commercial break. The interface 300 may recognize that the user is unlikely to stay on the new channel if the new channel is at a commercial break, and therefore, may hold off on buffering the content on the new channel. In contrast, the interface 300 may determine that it should buffer the content on channel 49 that is being consumed regardless of its content. The interface 300 may recognize that the user might want to utilize pause buffering features, such as being able to pause and rewind the content he/she is consuming, and therefore, may begin to buffer the content on the new channel (channel 49).

As shown in FIG. 4, to begin buffering the content on channel 49, the interface 300 may discontinue the buffering of content on channel 37, and in some cases, may drop the content from channel 37 that was buffered. In other words, the interface 300 may use the third buffer 303, which was used to buffer content on channel 37, to begin buffering the content on channel 49. The interface 300 may choose to use the third buffer 303 because channel 37 has not yet been visited. Since the user has not consumed content on channel 37 as of time t4 in this scenario, the interface 300 may determine that it is less likely that the user will want the buffered content on channel 37 in comparison to the content on the other buffered channels. Therefore, the interface 300 may choose to use the third buffer 303 for buffering channel 49 and continue buffering channels 35 and 26 using the first and second buffers, respectively.

Alternatively, at time t4, the interface 300 may determine to drop content that was already presented to the user to free up memory for buffering the new content on channel 49. Figuring that a user might be unlikely to desire the buffered content that he/she has already viewed, the interface 300 may identify the presented and buffered portions (e.g., shaded portions in FIG. 4) and overwrite those portions with the buffered content on channel 49.

Notably, other factors may contribute to determining which buffer to use for buffering content on a new unbuffered channel (e.g., channel 49). For example, the second buffer 302, instead of the third buffer 303, may be chosen to buffer channel 49 if the interface 300 determines that the user likes the content on channel 37 more than the content on channel 26. That is, a user's preferences may be considered when determining which buffer to use to begin buffering other content. Specifically, for example, the interface 300 may consult a ranked list of a user's favorite content to determine which piece of content currently being buffered is least-liked so that the interface 300 may use the tuner for buffering such content to buffer content recently-selected. Alternatively, for example, the interface may consult a list of a user's favorite channels to determine which piece of content currently being buffered is associated with a least-liked channel so that the interface 300 may use the tuner for buffering such content to buffer content recently-selected.

Although the scenario of FIG. 4 uses three tuners, more or fewer tuners may be used. Also, the number of tuners used for pause buffering might not be the same number of tuners in the interface 300. For example, the interface 300 for carrying out the scenario in FIG. 4 may include six tuners although only three tuners may be used for pause buffering. The remaining three tuners may be designated for recording content according to user settings.

Figure 5A:
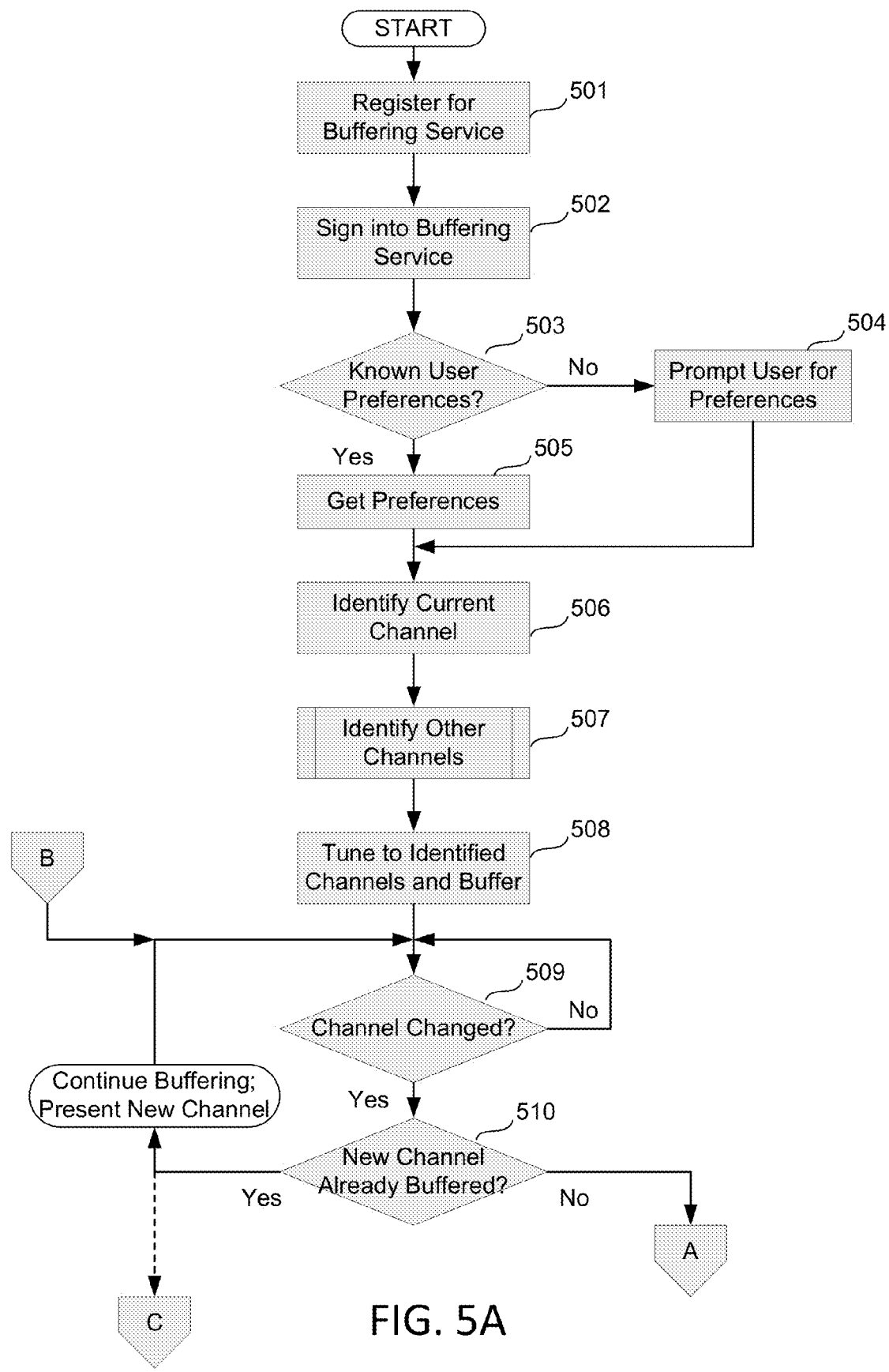
FIGS. 5A-5B are flow diagrams illustrating an example method according to one or more aspects of the disclosure.
Figure 5B:
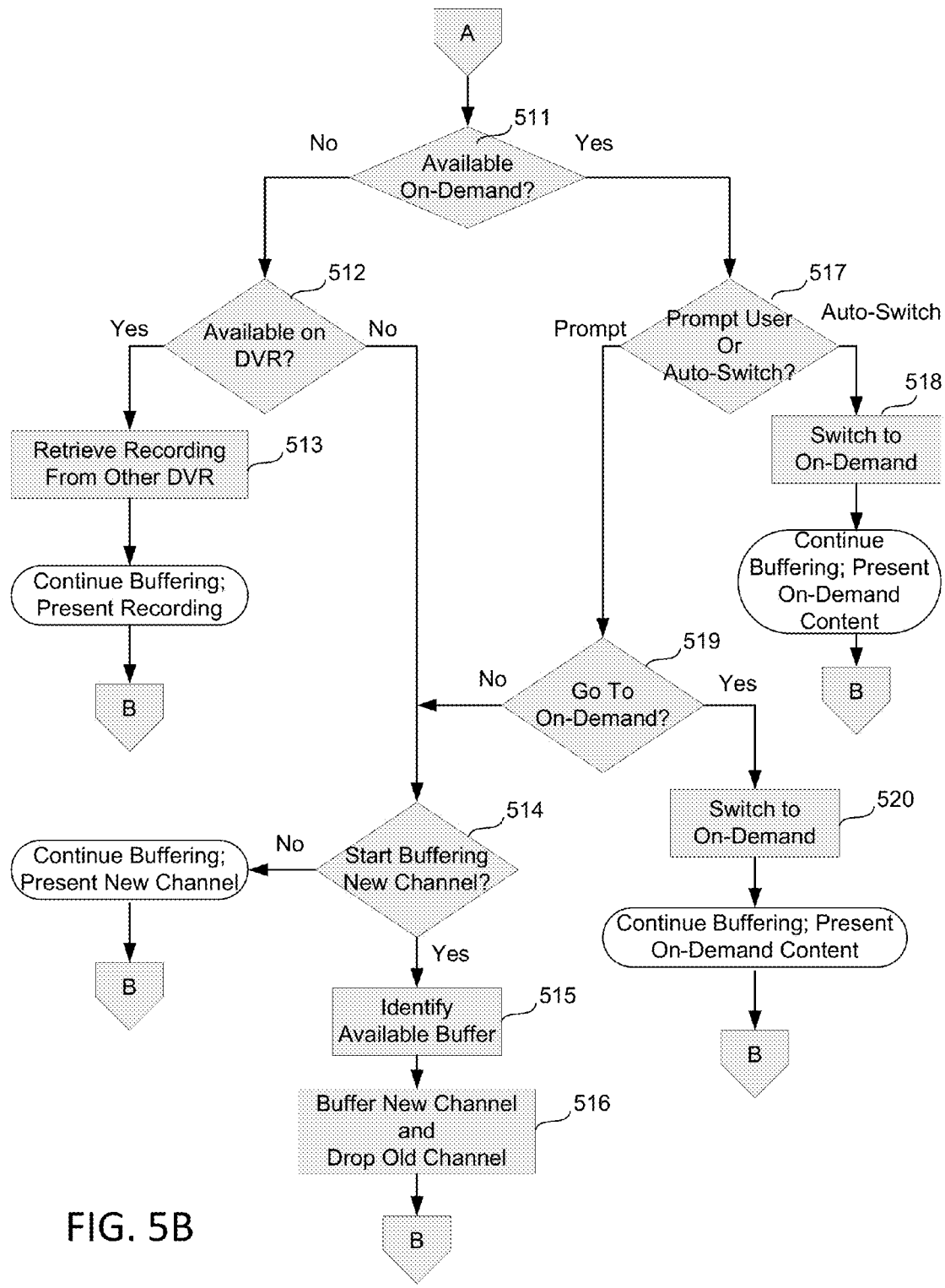

FIGS. 5A and 5B illustrate an example method of configuring and implementing intelligent content buffering. One or more computing devices 200 may be configured to perform the steps of this method to produce a user experience in which multiple pieces of content are buffered based on, in part, user preferences so that a user may jump back within the multiple pieces of content to view earlier portions thereof.

In step 501, using a computing device 200 (e.g., interface 300, a personal computer, tablet, service provider's server, etc.) a user may opt into an intelligent buffering service. Specifically, opting in, or registering for, the intelligent buffering service may include, for example, visiting a webpage of an entity providing the intelligent buffering service, selecting an option on a program guide of a television, or pressing a button on a computing device 200 that performs the intelligent buffering service. In some examples, this intelligent buffering service may be offered by a content service provider or a content recording entity. A user may opt into, or register for, the intelligent buffering service by setting up an account. Setting up an account may include establishing a username and/or password. In order to set up an account, the entity offering the intelligent buffering service may require an account number, such as a content service provider account number. Because it is contemplated that the same computing device 200 (e.g., interface 300) may be used to provide the intelligent buffering service for multiple users, each user of the computing device 200 may have his or her own account. As a result, the computing device 200 may perform intelligent buffering for one user in a different manner than it performs intelligent buffering for another user. Moreover, since users may be associated with an account as opposed to a particular computing device 200, a user may receive the intelligent buffering service using various computing devices 200. For example, a user may receive the intelligent buffering service through an interface 300 at her home and may receive the intelligent buffering service through a second interface 300 at another person's home if she signs into the service through the second interface 300.

Step 502 illustrates a step of signing into the intelligent buffering service. A user may sign into the intelligent buffering service by providing identification information, such as a username and/or password associated with an account established during the registration step of 501. In some cases, step 502 might not be performed or the computing device performing the intelligent buffering service may automatically perform the sign into step 502. In other words, step 502 might not require user input for signing into the intelligent buffering service. For example, an interface 300 may assume that a particular user is consuming content and may perform intelligent buffering based on that assumption. Or, the interface 300 may be pre-set to provide intelligent buffering service for a particular user whether or not that user is the actual user consuming content. Still, in some cases, intelligent buffering may be performed for a family or group of person (e.g., roommates, or consumers in a group collectively through a network) as a whole, and not for specific individuals, in which cases individual users might not sign in.

In step 503, the computing device 200 may determine whether user preferences are known. In cases where an individual has signed in at step 502, step 503 may check for user preferences specific to the individual that has signed in. If there are no known user preferences, step 504 may be performed to prompt and/or collect user preferences. In some examples, no user preferences may be added, and the intelligent buffering service may be provided based on default settings or previously learned settings. For example, an interface 300 may determine that a user prefers science fiction programs based on a user's past viewing history (which may include on-demand content consumed and content a user recorded using a DVR), and therefore, may use this information to create a learned user preference setting.

If there are known user preferences, then step 505 may be performed to retrieve those preferences. Retrieving user preferences may be performed using a username or other information identifying a signed-in user, if a user has signed-in at step 502. After performing either step 504 or step 505, step 506 may be performed to identify a presented logical channel (e.g., channel 26, channel 37, etc.). The presented logical channel is that channel having content that is being presented or consumed at a particular time. For example, the presented channel may correspond to the channel that carries the content that is being displayed on a television screen coupled to the computing device 200 that is tuned to the presented channel. Notably, the presented channel may change as a user changes channels.

At step 507, a subroutine for identifying other logical channels (other than the presented channel identified in step 506) may be performed. This subroutine is explained later in more detail with reference to FIG. 6. For now it suffices to understand that the step 507 may identify which other logical channels should be buffered. For example, referring to FIG. 4, at time t0 when channel 35 is being presented, step 507 may be performed to identify channels 26 and 37 as other logical channels to buffer.

Subsequently, at step 508, the computing device 200 may tune to the identified channels and begin buffering the content thereon. Specifically, an interface 300 may control a plurality of tuners to tune to a respective one of the channels identified in steps 506 and 507. Further, the interface 300 may control one or more buffers to begin buffering content on specific channels. For example, the interface 300 may assign a first and second buffer to buffer content on one channel and a third buffer to buffer content on another channel. As a result of step 508, a plurality of pause buffers may be generated for buffering a respective piece of content being broadcast on the identified channels. For example, referring to FIG. 4, if channels 35, 26, and 37 were identified at time t0, step 508 might cause the interface 300 to create a first pause buffer for channel 35 using buffer 301, a second pause buffer for channel 26 using buffer 302, and a third pause buffer for channel 37 using buffer 303.

Step 509 may be performed to monitor a user's selection to change the presented channel. For example, the interface 300 may evaluate infrared signals received through the infrared interface 310 to determine whether the signals indicate that a user has chosen a channel up/down button or provided a channel number different from the current channel number. Step 509 may be performed repeatedly (continuously or periodically) until a channel change is detected. However, a computing device 200 may stop performing step 509 when a user turns off the computing device 200 or a display device coupled thereto (e.g., a television).

When a channel change is detected (Yes at step 509), step 510 may be performed to determine whether the newly-selected channel is already being buffered at that time. To carry out this determination, the computing device 200 may store and maintain an up-to-date list of channels being buffered in memory (e.g., a local cache). The determination at step 510 may be performed by comparing the newly-selected channel to the channels on this list to see if there is a match. If the computing device determines that the new channel is already being buffered at this time (Yes at step 510), the computing device 200 may cause content on the new channel to be presented, and continue to buffer the same channels as before. That is, the computing device 200 might not change which channels are being buffered. After presenting the new channel, the process may return to step 509 to again monitor user selections for a channel change. Additionally, or alternatively, Yes at step 510 may lead to the method of FIG. 8 along path C.

In contrast, if the newly-selected channel is not already being buffered (No at step 510), the computing device 200 may proceed along path A to step 511. At step 511, the computing device may determine whether content on the newly-selected channel is available on demand. In other words, step 511 includes checking whether the content on the newly-selected channel matches on-demand content. To perform this check, the computing device 200 may compare an identifier (e.g., program name, program ID, etc.) corresponding to the content on the newly-selected channel with a list of on-demand content. Herein, as understood to those skilled in the art, on-demand content is content that is available for user consumption at any time a user wishes and may be rewound, forwarded, or otherwise manipulated.

In some examples, the comparison at step 511 may be performed by a computing device 200 at a premises 102 (e.g., the interface 300), while in other examples the comparison may be performed by a computing device 200 at the local office 103 (e.g., the application server 107). Where the comparison is done by a computing device 200 at the local office 103, a computing device 200 at the premises 102 may send a signal to the local office 103 indicating a channel identifier of the newly-selected channel or other information (e.g., a program title) identifying the content on the newly-selected channel. Using information received from the premises 102, the computing device 200 at the local office 103 may determine whether that content on the newly-selected channel is available on-demand to the user at premises 102. For example, the computing device 200 may compare the channel identifier with a timestamp (time and date) and a content listing (e.g., program guide) to identify the content on the channel that the user at premises 102 recently selected, and compare this identified content with a listing of on-demand content available to that user.

If the content on the newly-selected channel is not available on-demand (No at step 511), the process may proceed to step 512. At step 512, the computing device determines whether the content on the newly-selected channel is available as recorded content on a digital video recorder (DVR). To perform this determination, the computing device 200 may compare an identifier (e.g., program name, program ID, etc.) corresponding to the content on the newly-selected channel with a list of identifiers of content recorded on a DVR. Further, this determination may include polling a local DVR, a network DVR (nDVR), or another person's DVR (e.g., a neighbor or friend's DVR). If the content of the newly-selected channel has been recorded (in its entirety or for a sufficient duration) and stored on an accessible DVR, then the computing device 200 may retrieve the recorded content (e.g., DVR content) at step 513. In this regard, the computing device 200 may implement content fingerprinting to compare metadata associated with the linear content or information embedded in the transport stream (audio and/video stream) of the linear content with metadata of the DVR content or information embedded in the recorded data that was obtained from the transport stream when the DVR content was recorded, respectively. Further, one or more frames of the DVR content may be compared with reference frames stored at the local office 103 or another device on the network 109 to determine whether a start and/or end of the newly-selected, linear content is included in the DVR content (or whether a sufficient amount of frames of the newly-selected, linear content are included within the DVR content).

Once retrieved, the computing device 200 may cause a display device (e.g., television) to present the recording. Meanwhile, the computing device 200 may continue to buffer the same channels as before and return to step 509 to again monitor channel selections. Notably, if the content exists as a recording, there may be no desire to buffer the presented content and the buffers may continue buffering the same channels that were being buffered prior to the most recent channel selection.

If the content of the newly-selected channel is not available on a DVR (No at step 512), the process may proceed to step 514 to determine whether the content on the newly-selected channel should be buffered. Step 514 may include an evaluation to determine whether an interest in the presently consumed content rises to a level that justifies buffering it. Various algorithms may be used to determine the levels of interest. The fact that a piece of content is being presently consumed may weigh in favor of buffering that content, but does not necessarily mean that the content would outweigh other pieces of content. In some cases, the computing device 200 may determine, e.g., based on user preferences, that it is more desirable to buffer pieces of content on other channels as opposed to the content currently being presented. If the computing device at step 514 determines not to buffer the content on the newly-selected channel (No at 514), the computing device may continue buffering the channels as before and present the new selected content. Further, the process may return to step 509 to monitor for a subsequent channel change.

However, if the content on the newly-selected channel should be buffered (Yes at step 514), step 515 may be performed to identify an available buffer that can be used to buffer the content on the newly-selected channel. In some cases, all buffers may be actively buffering content, and therefore, the computing device 200 may have to identify which one of the buffers actively buffering content should be switched. That is, the computing device 200 may choose to stop a buffer from buffering some other content to free-up that buffer for the newly-selected content. In such cases, at step 516, a buffer used to buffer other content may be switched to buffering the content of the newly-selected channel. Moreover, when performing this switch, the computing device 200 may cause the identified buffer to dump the content it previously buffered before switching over to buffer the newly-selected content. Where a circular buffer is implemented, the buffer may maintain a portion of the previous piece of content buffered, and overwrite the earliest parts of the previous piece of content with the new piece of content being buffered. The computing device 200 may store a pointer in memory to identify where the previous piece of content can be accessed. Further, after step 516, the process may proceed to step 509 to monitor for a subsequent channel change.

Returning to step 511, if it is determined that content is available on demand (Yes at step 511), the computing device 200 may determine whether to prompt the user or automatically switch to the on-demand content at step 517. In some cases, a user may have previously set a setting to instruct the computing device 200 to automatically switch to on-demand content (e.g., this setting may be generated and stored in steps 504 or 505 described above). In such cases, the determination at step 517 may include checking the value of such a setting. If the computing device is configured to automatically switch to the on-demand content (Auto-switch at step 517), then the switch may occur at step 518. That is, the computing device 200 may cause a display device (e.g., television) to present the on-demand content corresponding to the content on the newly-selected channel. The on-demand content may begin at various playback points, such as at the beginning of the on-demand content or at a point that is a certain time prior to (e.g., one minute before) the time that the corresponding linear content was selected. Content fingerprinting and/or frame comparison as described above may be used to locate the point at which to begin presenting the on-demand content. For example, the computing device 200 may send a frame of the newly-selected, linear content to a server on the external network 109 that may compare the received frame with frames for the linear content and provide a timepoint to the computing device 200 at which it may begin presenting the on-demand content. Meanwhile, the computing device 200 may continue to buffer the same channels as before and return to step 509 to again monitor channel selections. Notably, if the content exists as on-demand content, there may be no desire to buffer the presented content and the buffers may continue buffering the same channels.

If the computing device 200 determines that a user has not previously chosen to automatically switch to on-demand content or the user has explicitly indicated that he/she wishes to be prompted (prompt at step 517), then a message may be displayed to the user requesting the user to indicate whether the user would like to see the on-demand content. Step 519 may then be performed to determine the user's response to this message. If no response is received after a certain period of time, the computing device 200 may use a default decision. However, if the user chooses to switch to the on-demand content (Yes at step 519), then the switch may occur at step 520. At step 520, the computing device 200 may cause a display device (e.g., television) to present the on-demand content corresponding to the content on the newly-selected channel. Meanwhile, the computing device 200 may continue to buffer the same channels as before and return to step 509 to again monitor channel selections. Notably, if on-demand content is being presented, there may be no desire to buffer the presented content and the buffers may continue buffering the same channels.

Alternatively, if the user chooses not to consume the on-demand version of the content (No at step 519), the process may proceed to step 514 to determine whether the content on the newly-selected channel should be buffered as described above. Steps 515 and 516 may also be performed depending on the decision made at step 514. Although not shown in the example of FIG. 5B, in some embodiments, if the user chooses not to switch to the on-demand version (No at step 519), the process may proceed to step 512 to determine whether the content is available on a DVR.

Figure 6:
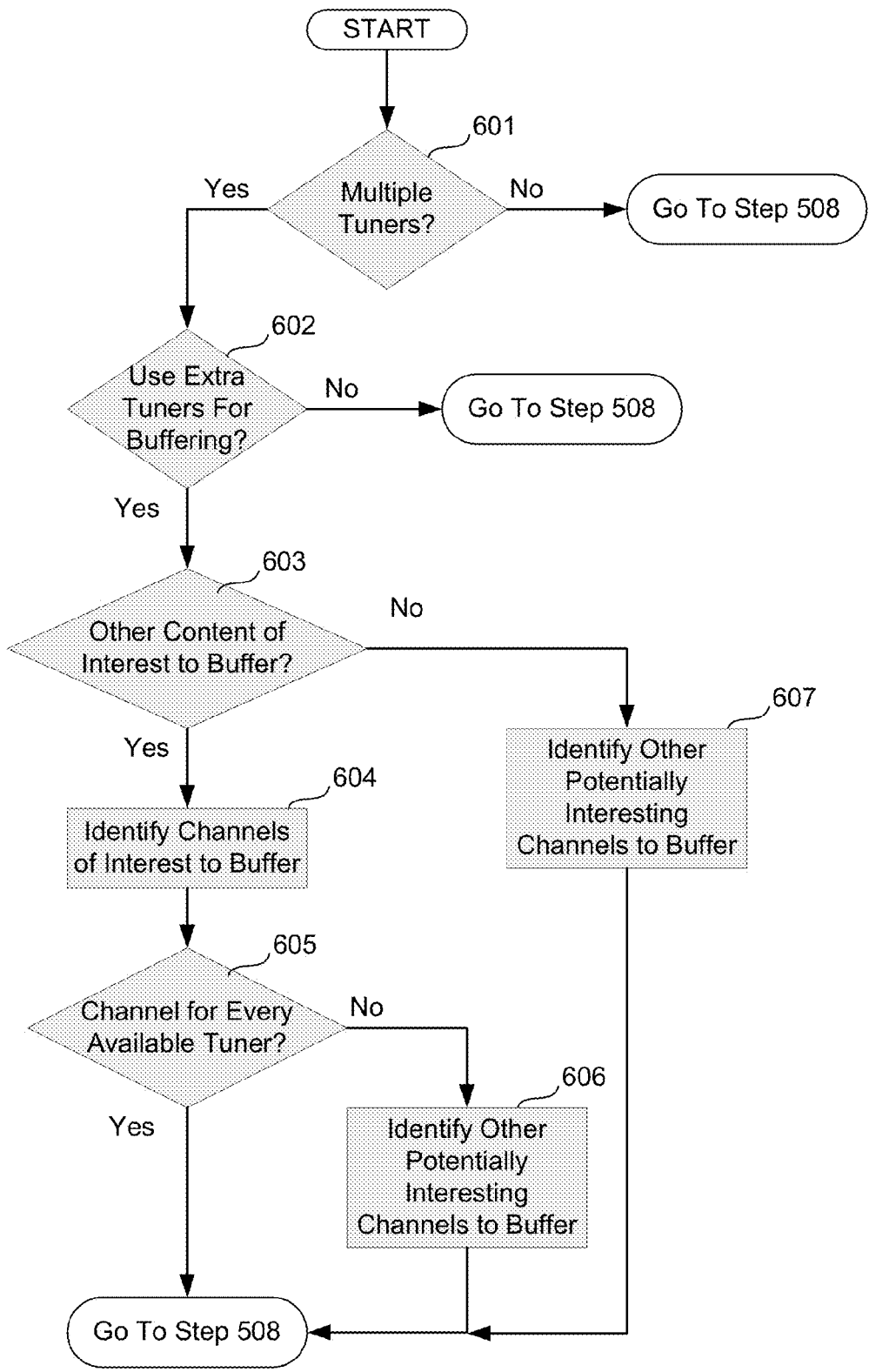
FIG. 6 illustrates an example subroutine of the method of FIGS. 5A-5B.

FIG. 6 illustrates example steps of the subroutine of step 507. As mentioned above, this subroutine may identify which channels to buffer in addition to the channel of the content being consumed at the time. An aspect of the present disclosure is to buffer content on channels other than the channel of the content being consumed, and the subroutine of FIG. 6 illustrates how that aspect may be achieved.

Step 601 may be performed after step 506 of FIG. 5. In step 601, the computing device 200 may determine whether it has multiple tuners to implement the steps of FIG. 6. Different computing devices 200 may have different numbers of tuners. Further, the methods disclosed herein may be rolled-out to customers with various computing devices 200. Referring to, for example, the interface 300 of FIG. 3, that interface 300 has six tuners, and therefore, may determine that it has multiple tuners at step 601. If a computing device 200 determines that it has multiple tuners, it may perform step 602. In contrast, if the computing device 200 determines that it does not have multiple tuners (No at step 601), then the subroutine of FIG. 6 may return to step 508 of FIG. 5A. If the process returns to step 508 after determining that there are not multiple tuners, the computing device 200 might only tune to and buffer the current channel.

In step 602, the computing device 200 may determine whether to use the extra tuners for buffering. In some examples, the computing device 200 may have multiple tuners, but a user might not want the extra tuner(s) to be used for buffering. The computing device 200 may retrieve settings stored in association with a user profile to determine whether a user wants to use extra tuners for buffering and how many tuners they want to use for buffering. These settings may be designated by a user or determined based on a user's channel surfing behavior. A user who channel surfs relatively frequently may desire that more extra tuners be used to support pause buffers. In comparison, a user who channel surfs relatively infrequently may desire that extra tuners be available for use to record scheduled recordings, rather than to support pause buffers for other content that a user may flip to and consume. Further, determining whether the extra tuners should be used for buffering may include determining whether the extra tuners are available. In some instances, one or more of the extra tuners may be used to record other pieces of content while a user consumes (e.g., views) a different piece of content. For example, where a computing device 200 includes two tuners and one tuner is being used to record a piece of content while the other tuner is being used to present a different piece of content to the user, the computing device 200 may determine that there are no extra tuners to use for buffering other pieces of content at step 602. In comparison, where a computing device 200 includes 4 tuners and one tuner is being used to record a piece of content while another tuner is being used to present a different piece of content to the user, the computing device 200 may determine that there are two extra tuners available for buffering. If no extra tuners are available, the process may return to step 508 of FIG. 5A. If the process returns to step 508 after determining that there are no extra tuners available for buffering, the computing device 200 might only tune to and buffer the current channel.

If extra tuners are available for buffering, step 603 may be performed to determine whether other content of interest is available to buffer. This determination may be made by detecting whether user preferences match with any of the available broadcasted content at the time of the determination. For example, if a user has indicated a particular program as their favorite program, the computing device 200 may determine whether that program is currently being broadcasted on a different channel than the channel that the user is consuming content from currently. Alternatively, user preferences may indicate a genre of content that is desirable (e.g., comedy shows, sports, reality television shows, etc.), and the computing device 200 may determine whether any of the currently broadcasted content falls within the desired genre of content. To perform the determination at step 603, the computing device 200 may utilize a content listing (e.g., an electronic program guide) as a resource of content currently being broadcasted. Other methods for determining what content a user may be interested in may be implemented as well. For example, the methods disclosed in U.S. patent application Ser. No. 13/559,341, which is incorporated by reference herein, may be used to identify content that a user may be interested, and therefore, may be buffered.

In some examples, the computing device 200 may use preferences to score each piece of content currently being broadcasted when executing step 603. In such examples, the computing device 200 may compare the scores against a predetermined threshold to determine whether any of the content currently broadcasted meets a minimum level of interest. If none of the scores exceed the threshold, the computing device may determine that there is no other content of interest to buffer at step 603 (No at step 603).

However, if the computing device 200 does determine that one or more pieces of content currently being broadcasted might be of interest to the user (Yes at step 603), the computing device 200 may identify the channels (logical or frequency) that are carrying such content at step 604. Specifically, step 604 may include retrieving channel identifiers (e.g., logical channel numbers) or channel frequencies corresponding to the content of interest detected in step 603. For example, step 604 may include identifying the three channels carrying the three pieces of content with the highest similarity scores computed in step 603. Alternatively, if only one score exceeds the predetermined threshold, the computing device may only retrieve the channel identifier or channel frequency corresponding to the content with that score.

In addition, when selecting other content to buffer, the computing device 200 may identify similar versions of the same content to avoid buffering the similar versions. For example, the computing device 200 may identify simulcast versions (e.g., standard definition version, high definition version, three-dimensional (3D) version, etc.) of the same piece of content to filter the results of steps 603 and 604 thereby possibly preventing multiple tuners and/or buffers of the computing device 200 from buffering the same piece of content.

Subsequently, at step 605, the computing device may determine whether a channel for every available tuner has been identified in step 604. For example, if there are five tuners in all and four of the tuners are available for buffering other content of interest, then the computing device 200 may determine whether four channels have been identified as having content that might be of interest and should be tuned to. If only three channels have thus far been identified as including content of interest, the computing device 200 may determine that it should identify an additional channel to tune the spare tuner to. In such event, the computing device may perform step 606.

In step 606, the computing device 200 may identify other potentially interesting channels to buffer. Such channels may be channels that carry content of similar interests to other content that the user likes. Also, other potentially interesting channels may include favorite channels of a user. Rather than evaluating the content itself to determine whether the content is of interest, the computing device may choose one or more of a user's favorite channels. Users may indicate their favorite channels through user preference settings, and/or the computing device 200 may track a user's history and determine a user's favorite channel based on how frequently a user visits a channel and/or how long a user spends consuming content on a channel.

Alternatively, other potentially interesting channels may include one or more channels directly above and/or below the channel the user is currently consuming content on. The computing device 200 may determine that the user is likely to scroll down or up from the channel he/she is currently consuming content on (e.g., press a channel down or channel up button), and therefore, may identify the neighboring channels as other potentially interesting channels that should be buffered. In some examples, the computing device 200 may track user selections and detect that the user is surfing down or up through the available channels in consecutive order. If the computing device 200 detects such behavior, the computing device may choose the channels it expects the user to reach shortly and identify those channels as other potentially interesting channels. For example, if the computing device detects that a user is scrolling down through the available channels in consecutive order, the computing device may identify the next two channels in that order in anticipation that the user will desire content on those channels in due course. Further, the number of channels identified in step 606 may correspond to the number of available extra tuners available for buffering that are not already assigned to buffer content of interest.

Returning to step 603, if the computing device 200 determines that no other content being broadcasted at the time of execution might be of sufficient interest to the user to justify buffering, then the computing device 200 may perform step 607. In step 607, the computing device may identify other potentially interesting channels to buffer in a similar manner as described in step 606.

Once the computing device 200 identifies a channel for each of the extra tuners available for buffering, the process may proceed to step 508. That is, whether the computing device 200 determines that a channel for every available tuner has been identified at step 605 (Yes at step 605) or performs one of steps 606 and 607, the computing device may proceed to step 508 of FIG. 5A.

Figure 7:
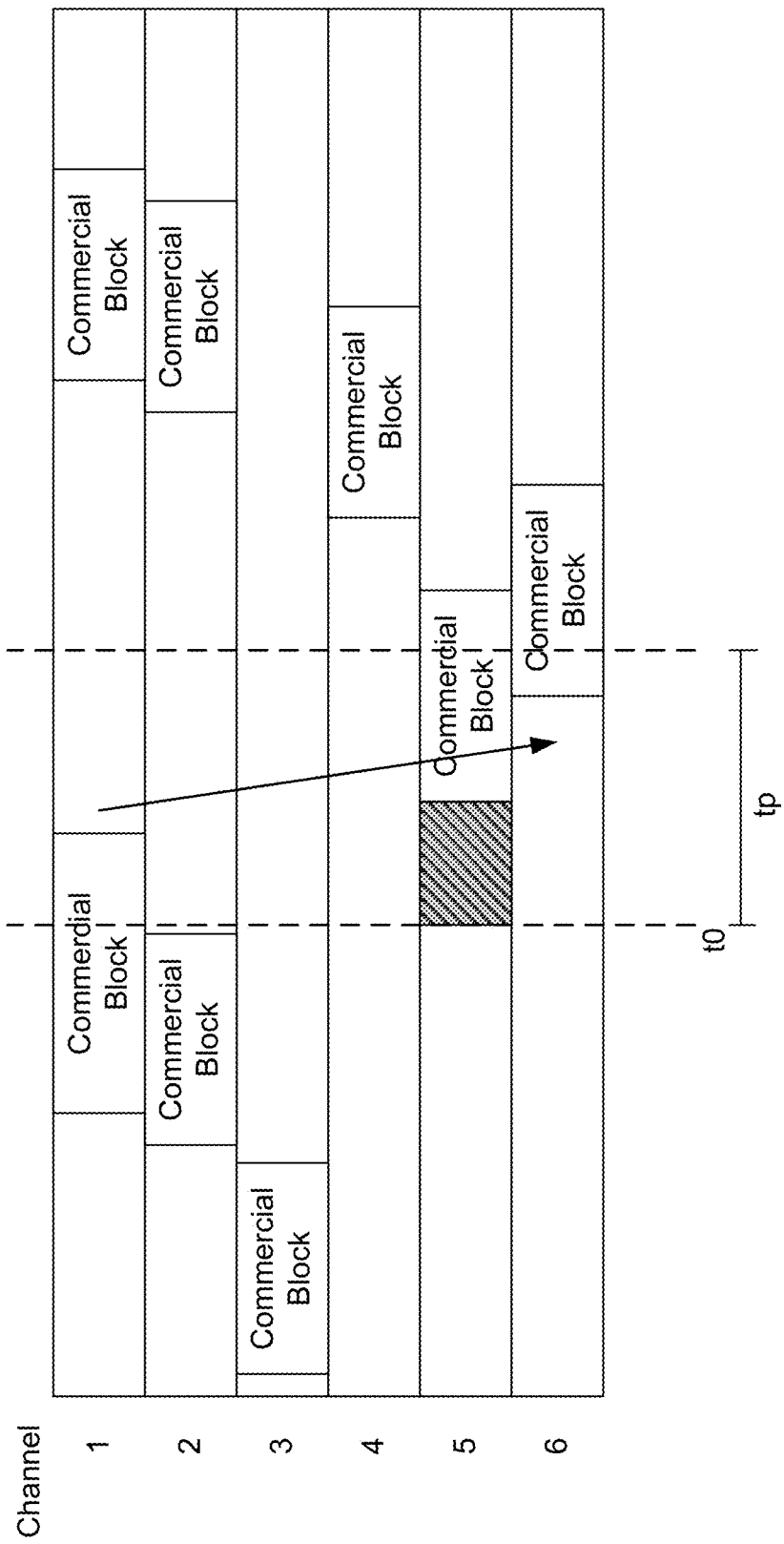
FIG. 7 is a diagram illustrating one or more aspects described herein.

FIG. 7 illustrates another aspect of the present disclosure related to using buffers to buffer content so that users may view the content, and not commercials (advertisements), when initially tuning to and consuming (e.g., viewing) content on a channel. When a user changes channels, the content presented on the new channel may be a commercial and not the primary content being carried on that channel. This situation may occur a number of times when a user is channel surfing (e.g., scrolling up/down through channels or jumping around between channels) in order to find a particular piece of content or content that interests him/her. If the user lands on a channel when it is showing a commercial, the user may decide that he/she does not want to watch the commercial or wait for it to end, and may change the channel again. However, rather than changing the channel again, users may prefer to view at least a portion of the primary content that was transmitted on that channel prior to the commercial (or at some other time).

Referring to FIG. 7, a plurality of logical channels (e.g., channels 1-6) is shown. For ease of explanation, the channels are identified by consecutive logical channels, although they may be any available channel. As indicated by the arrow of FIG. 7, a user consuming content on channel 1 may choose to scroll down through the available channels (e.g., by pressing/holding the channel down button). As a different channel is selected, the content presented changes. Since primary content is being broadcast on channels 1-4 when those channels are selected, the primary content is broadcast to the user. However, when channel 5 is selected, the content currently being broadcasted is a commercial and not the primary content (e.g., a television program). Therefore, in accordance with the present disclosure, the computing device 200 (e.g., interface 300) may present the shaded portion of the primary content that was carried on channel 5 prior to the commercial block instead of a commercial. Assuming that the computing device 200 was using an extra tuner and buffered a portion of the primary content on channel 5 prior to the commercial block (represented by the shaded portion), the computing device 200 may detect the commercial block and cause the buffered portion to be presented. For example, if the computing device 200 had predicted that the user might select channel 5 (because channel 5 carries content that the user is interested in, is a favorite channel of the user, or a likely destination given the direction of the user's channel surfing), the computing device 200 may have chosen to buffer channel 5 ahead of when channel 5 is selected. Therefore, at the time channel 5 is selected, the computing device 200 may present the buffered portion of the primary content instead of the commercial break.

Figure 8:
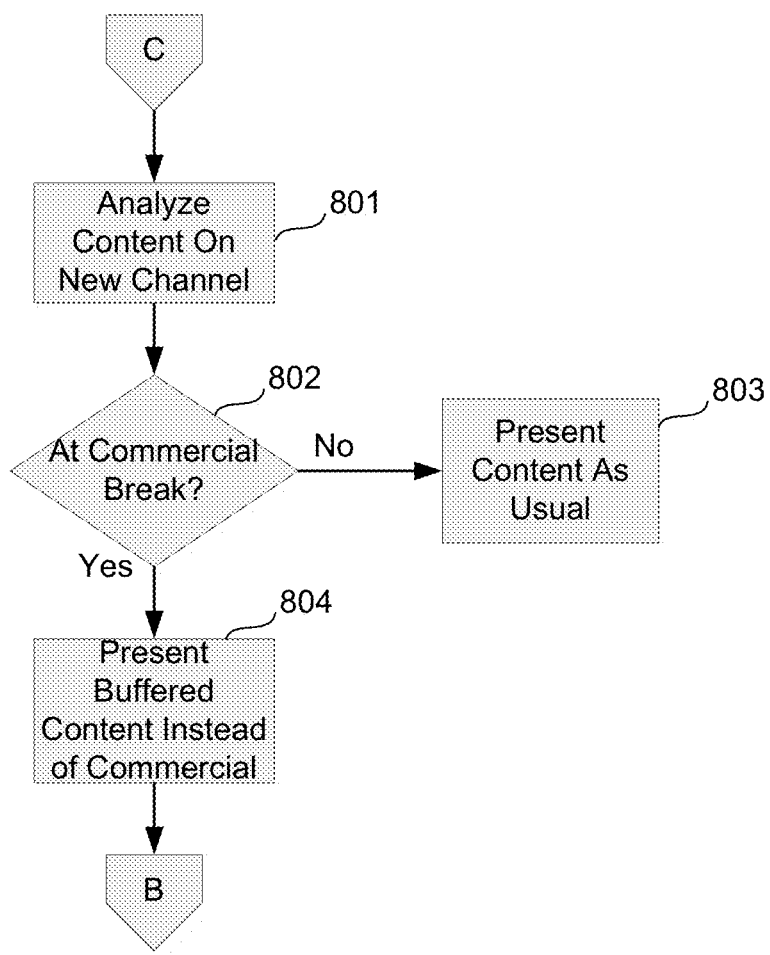
FIG. 8 is a flow diagram illustrating an example method according to one or more aspects of the disclosure.

FIG. 8 illustrates an example method for buffering content and providing the buffered content instead of a commercial. Step 801 may be performed when a computing device 200 determines that a new channel is buffered at step 510 (Yes at 510). This is shown by the dotted line to path C in FIG. 5A. Accordingly, the method of FIG. 8 may pick-up after one or more channels have been identified and buffered.

In step 801, the computing device 200 may analyze the content on the new channel. Specifically, the computing device 200 may evaluate the content currently being broadcast on the new channel to identify whether it is part of the primary content (e.g., a program) or commercial. This analysis may include looking at tags within the video and/or audio stream to identify the start and end of a commercial block. In some cases, each frame in the video stream that is part of a commercial may have an identifier to identify that it is part of a commercial. Therefore, the computing device 200 may decode the video stream to detect whether the frame includes such an identifier.

In other cases, the video stream may include a first tag indicating the start of a commercial block and a second tag indicating the end of a commercial block. Therefore, the computing device 200 may store flags in memory to keep track of whether the start tag and end tag have been detected. For example, the computing device may set a flag to a logic '1' value when the start tag is detected and set the flag back to a logic '0' value when the end tag is detected. A temporary flag may be created in memory for a specific channel each time the computing device 200 decides to buffer that channel to track the start and end tags. Initially, the created flag may be set to a default value (e.g., a logic '0' value) so that the computing device 200 may assume the content is not at a commercial block until a start or end tag is detected. By checking the value of this flag for a new channel upon selection of the new channel, the computing device 200 may analyze the content.

In still other embodiments, the computing device 200 may receive information about which channels are broadcasting a commercial block at which times. This information may be received from, for example, an application server 107 of the local office 103 or another computing device on the network. This information may be sent periodically (e.g., at about the beginning of each day) or whenever it is known when a commercial block will take place. For content related to live events, this information may be pushed to the computing device 200 just moments before a commercial block is about to be inserted. Whenever this information is received, it may be stored in memory for subsequent analysis. In accordance with the above, analyzing content at step 801 may include evaluating this stored information in relation to the newly-selected channel. In some cases, the information about which channels are broadcasting a commercial block at which times may be received via a network (e.g., Internet) connection. A server (or other computing device) on the external network 109 may include information regarding commercials on a program-by-program basis, and referenced by the computing device 200 when desired. In other words, such a server could provide an online resource indicating which channels are at a commercial break (which may depend on geography). Alternatively, the information about which channels are broadcasting a commercial block at which times may be received via a dedicated broadcast channel.

After analyzing the content, the computing device 200 may determine whether a commercial block is currently being transmitted on the newly-selected channel at step 802. If the computing device determines that channel is not currently broadcasting a commercial (No at 802), the computing device 200 presents the content as usual at step 803. That is, the computing device 200 causes the linear programming on the newly-selected channel to be presented. However, if the computing device 200 determines that the newly-selected channel is currently carrying a commercial (Yes at 802), the computing device may proceed to step 804.

In step 804, the computing device 200 may automatically present the buffered content to the user instead of the commercial. In other words, the computing device 200 may automatically draw content from a pause buffer for the newly-selected channel. Specifically, the computing device 200 may read the content stored in the pause buffer for that channel and present that content. In some cases, the computing device 200 may start presenting the earliest stored portion of the content within the pause buffer. Alternatively, the computing device 200 may jump back through the buffered content to a predetermined time before the commercial break began (e.g., 1 minute before the commercial break, 30 seconds before the commercial break, etc.). In some examples, this predetermined time may be set by a user. Some users may prefer to watch an entire minute of content prior to the commercial while other users may be satisfied with 30 seconds of content prior to the commercial. As a result of the above steps, the user may receive an experience as though they were watching the content prior to the commercial, and decided to jump back using their pause buffer to watch the content leading up to the commercial. However, given the above described steps, the user would not have to make this decision to jump back or select any buttons at the time of selecting the new channel, because the computing device 200 may automatically determine to buffer content and present the buffered content due to the commercial.

While step 804 above describes that buffered content may be presented, in other embodiments, when a commercial is detected on a newly-selected channel, the computing device 200 may present on-demand content, DVR content, or content from another source (e.g., IP-delivered content (e.g., a YouTube™ clip) from a server on the external network 109).

As the user consumes the buffered content, the computing device 200 may continue to buffer the content on the same channel. Since the computing device 200 continues to buffer the content, the user may continue to consume the buffered content. As a result, the user may consume the content in a time-shifted manner without interruption. In other words, the content may be delayed from its broadcasting time, but otherwise, it may be presented to the user in the same manner that it would be presented if it were being played back as broadcasted without the pause buffer.

In comparison, in some embodiments, the computing device 200 might only present the buffered content for a certain predetermined period of time (e.g., one minute), before returning the user to the normal broadcasted content. That is, the computing device 200 may present buffered content for a certain period of time so that the user may consume the content just before the commercial, but once that certain period of time is up, the computing device 200 may present the content without a delay.

Figure 9A:
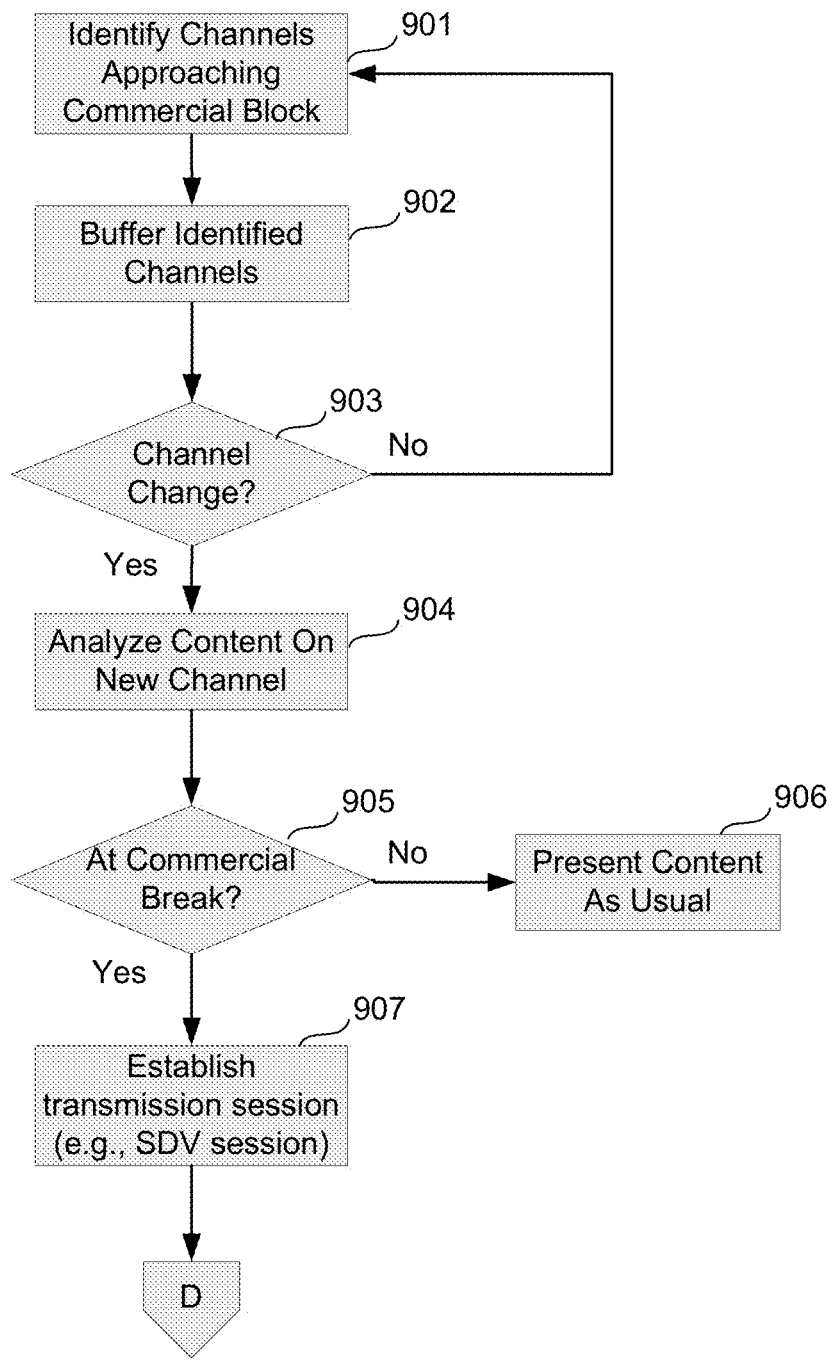
FIGS. 9A-9B are flow diagrams illustrating an example method according to one or more aspects of the disclosure.
Figure 9B:
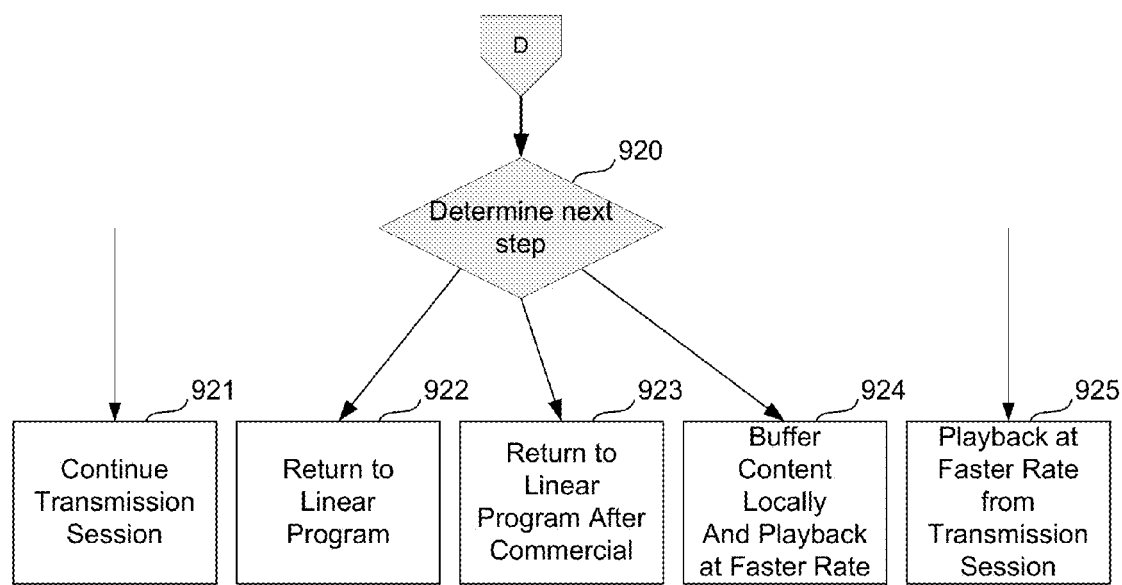

FIGS. 9A-9B illustrates another example method for buffering content and providing the buffered content instead of a commercial. In the method of FIGS. 9A-9B, buffering may be performed by a computing device 200 upstream of a user premises 102. For example, buffering may be performed by a computing device 200 (e.g., an application server 107) in the local office 103.

In step 901, the application server 107 may evaluate a plurality of logical channels and identify one or more of those channels that are approaching a respective commercial block. In other words, the application server 107 may identify logical channels that are within a predetermined amount of time from the start of a commercial block. For example, the application server 107 may determine which logical channels will be presenting a commercial within the next minute. Referring to FIG. 7, if step 901 is executed at time t0, the application server 107 may identify channels 5 and 6 since a commercial block is due to be presented on those channels within a predetermined amount of time tp (e.g., two minutes).

In step 902, the application server 107 may begin to buffer the channels identified in step 901. Again, referring to FIG. 7, if step 901 is executed at time t0, step 902 may cause the application server 107 to begin buffering content on channels 5 and 6 at time t0. As a result, the application server 107 may store portions of pieces of content immediately preceding commercial blocks in those pieces of content.

In some embodiments, rather than perform steps 901 and 902, the application server 107 may buffer a portion of the content of all logical channels. The application server 107 may use a first-in first-out (FIFO) buffer to buffer a predetermined amount (e.g., a minute's worth) of content on each logical channel regardless of whether that channel has an upcoming commercial block. Then, when a commercial on a channel is broadcasted, the buffer for that channel may refrain from buffering the commercial thereby keeping a portion preceding the commercial. For example, referring to FIG. 7, the application server 107 may have a buffer assigned to each of channels 1-6 to store a predetermined amount of content (e.g., one minute's worth) presented on each channel. Thus, at any given point in time, the application server 107 may have a recorded portion of the content (e.g., the previous minute of content) on any channel.

Still, in other embodiments, a hybrid configuration may be used in which some buffers are used to buffer all live events (e.g., reality television shows, sports, etc.) while other buffers are used for taped (e.g., pre-recorded) events. Since commercial breaks of live events might not be predictable, buffers may be used to continuously buffer the content on these channels. Meanwhile, the buffers for buffering content on the taped events may be shared where information regarding when commercial breaks will occur is known.

Step 903 may include detecting a user's selection to change the presented channel. A computing device 200 at a premises 102 (e.g., interface 300) may monitor user inputs to determine whether a user has selected to change the presented channel. If a channel change is not detected (No at step 903), steps 901 and 902 may be repeated. To save storage capacity, the application server 107 may dump recorded content in some buffers if a channel change has not been detected for some period of time. For example, the application server 107 may be configured so that it only maintains buffered content for three minutes before dumping the content and using the buffer to store content on another channel having an upcoming commercial. Essentially, the application server 107 may be configured to assume that if a channel change was not detected and reported within, e.g., three minutes then the buffered content for a channel that has passed its commercial block is no longer needed. Of course, in embodiments where there is a buffer for each channel, the buffered content might not be dumped entirely, and instead, as described above, each buffer would continuously dump the oldest buffered content and buffer the most recently broadcasted content.

If a channel change is detected at step 903 (Yes at 903), the interface 300 may analyze the content on the new channel at step 904. Specifically, the interface 300 may evaluate the content currently being broadcast on the new channel to identify whether it is part of the primary content or a commercial. Step 904 may be performed in any one of the manners described above with respect to step 801 of FIG. 8. Alternatively, instead of analyzing the content, the interface 300 may transmit a signal to the application server 107 at step 904. Specifically, the interface 300 may send a signal indicating that a channel change has been made and identifying the newly-selected channel.

In step 905, the application server 107 may use the information from the received signal to determine whether the newly-selected channel is presenting content at a commercial. If not (No at step 905), the application server 107 may send a reply signal instructing the interface 300 to present the content as usual (e.g., tune to the newly-selected channel as usual) at step 906. On the contrary, if the application server 107 determines that the newly-selected channel is at a commercial block, the application server 107 may proceed to step 907.

In comparison, if the interface 300 analyzes the content itself at step 904, then the interface 300 may determine whether the newly-selected channel is presenting content that is at a commercial at step 905. If the interface 300 determines the newly-selected channel is at a commercial, it may then send a signal, indicating this determination, to the application server 107. This signal may include a request for a switched digital video session for a particular piece of content or a particular channel.

In any event, at step 907, the application server 107 may employ a transmission session (e.g., a switched digital video (SDV) session). Specifically, before the interface 300 tunes to the newly-selected channel, the application server 107 may establish (or set up) a particular transmission session (e.g., an SDV session) to present a particular piece of content to the user instead of the commercial that the user would otherwise view. Then, once the transmission session is set up, instead of tuning to the selected channel, the interface 300 may tune to a separate channel associated with the session. The transmission session may include a unicast signal that is transmitted to a particular interface 300 or may include a multicast signal that one or more interfaces 300 at respective premises 102 may receive. In some examples, the interface 300 may analyze a user's viewing behavior (e.g., channel selections) to detect which channels the user is likely to select and arrive at a commercial. Based on these results, the interface 300 may set up a particular session (e.g., an SDV session) for a particular channel before that channel is even requested by a user. For example, if it is detected that a user is changing channels, a session may be set up for the next channel in the predicted sequence of channel selections that is currently presenting a commercial.

Indeed, a transmission session (e.g., an SDV session) could be set up even when a user is not channel surfing, and instead has been consuming a single piece of content for a relatively long time (e.g., eight minutes). If the interface 300 determines that resources are available (e.g., enough bandwidth is available) and/or that there is some likelihood that the user will select a new channel, the interface 300 may set up a transmission session in advance of a new channel selection. This session could then be used to deliver whatever piece of content the user selects if that content is at a commercial break. Thus, a single transmission session could be configured to deliver any one of a plurality of pieces of content at any particular time.

In some examples, the transmission session may be configured to present a portion of the content on that channel that was buffered at step 902. For example, the transmission session may present a piece of the content corresponding to the minute of content broadcasted just prior to the commercial. In some examples, instead of presenting buffered content in the transmission session, the application server 107 may use a predetermined piece of content. For example, content creators may provide separate content specially designed for display in the transmission session. This specially designed content may be a brief summary of events thus far along with a logo of a sponsor.

Notably, since the method of FIG. 9A is performed in response to a channel change (e.g., a channel change detected in 903), the substitution of a commercial with a particular piece of content might only occur for users who just changed the channel. That is, a transmission session (e.g., an SDV session) might not be set up for a user who was already consuming the content when it went to a commercial break. Therefore, users who are consuming content prior to a commercial block may still consume the commercial blocks as normal.

FIG. 9B illustrates steps that may be performed after the transmission session (e.g., SDV session) is established. The different steps illustrate the different options for handling how the content on the newly-selected channel will be presented to the user after the user finishes consuming the particular piece of content (e.g., the one minute portion of the content prior to the commercial) that the transmission session was set up to present. At step 920, the interface 300 may determine which option to take. In some embodiments, these options may be available as settings to the user. In other words, users may be able to, through their interfaces 300, indicate which of the one or more options they would like to have happen. Thus, at step 920, the interface 300 may check a user profile or user settings to determine which option to employ.

In step 921, the interface 300 may stay tuned to the transmission session for the length of the content (e.g., a television program) that the transmission session is presenting. For example, if the transmission session is set up to show a part of a television program one minute before a commercial break and the user chooses to continue watching, the transmission session may play the part that is one minute before the commercial break and keep playing the content as though the user was watching the linear program. Essentially, the transmission session delivers the program in a time-shifted manner. In step 921, the transmission session may end when the program ends and the user would be dumped back into the broadcasted content on the channel he/she selected that initiated the transmission session. The transmission session may also end if the user changes the channel to leave the transmission session and the content that it is presenting. Alternatively, the transmission session may remain open and used to deliver another piece of content should the user land on another commercial when selecting a new channel in the future.

In step 922, the interface 300 might only tune to the channel of the transmission session for the duration that the transmission session is playing the buffered content (e.g., one minute). After presenting the portion of the content that was buffered before the commercial, the interface 300 may tune to the actual channel that the user had selected which prompted the transmission session to be created. In this case, the user may skip a portion of the commercials to consume the content that was presented before the commercial break. However, if a commercial block is still being broadcasted after the user finishes consuming the buffered portion, the user would then consume the remainder of the commercial block.

In some cases, the length of the buffered content presented via the transmission session may be adjusted. In particular, depending on how far into a commercial break the user selected the new channel, the transmission session may present different durations of buffered content. For example, given a two minute commercial break on a newly-selected channel, if the user selects the new channel thirty (30) seconds into the commercial break, the transmission session may present a minute and a half (1:30) of buffered content, whereas if the user selects the new channel a minute and a half (1:30) into the commercial break, the transmission session may present only thirty (30) seconds of buffered content. As such, the interface 300 may be configured to present a transmission session configured to show only an amount of buffered content corresponding to the amount of time left in a commercial break.

In step 923, the interface 300 may present the portion of the content before the commercials as well as the commercials themselves. Then, when the commercials are over, the interface may tune to the actual channel that the user had selected which prompted the transmission session to be created. In this case, the user will not miss any of the commercials. However, the user may miss a portion of the content that was broadcasted immediately after the commercial break.

In step 924, the interface 300 may, using an extra tuner, tune to and begin locally buffering the content on the channel that the user selected while tuning to and presenting the transmission session. Therefore, once the transmission session finishes presenting the portion of the content prior to the commercial, the interface 300 may switch to present the locally buffered portions, which may include the commercials that the user was missing. Meanwhile, the interface 300 may continue to locally buffer the content being broadcast/ multicast on that channel while the user consumes the buffered portions. Further, in some embodiments, rather than playback the buffered portions at their normal broadcast speed, the interface 300 may cause the buffered portions to be played-back at a faster rate (e.g., 1.2× normal speed). In this manner, the interface 300 may catch the user up to the content being broadcasted. Once the user is caught up, the interface 300 may stop buffering the content on that channel. Notably, the option in step 924 might only possible if the interface 300 has at least two tuners (one to present the transmission session and another to buffer the broadcasted content on the selected channel). However, in some embodiments, the transmission session may be broadcast in the same transport stream on the same frequency as the linear content, and a single tuner may decode the entire transport stream. In yet another embodiment, a single tuner could receive the linear content, while a decoder receives buffered content (or other content to supplement the linear content during a commercial break) through an IP connection. For example, one tuner could buffer the linear content being broadcast/multicast, while a decoder presents supplemental content accessible via a link (e.g., HTML hyperlink) at a faster rate until the supplemental content catches up to the linear content.

In step 925, the transmission session itself may present content at a faster rate than its normal playback speed to catch the user up to the regularly broadcasted content. In some examples, the transmission session might only speed up the content and not the advertisements within the content. Once the content on the transmission session is caught up to the regularly broadcasted content, the transmission session may be terminated, and the interface 120 may switch over to the selected channel to present the regularly broadcasted content.

Figure 10:
FIG. 10 is a diagram illustrating one or more aspects described herein.

FIG. 10 illustrates that the channel changes discussed herein may be made by navigating a guide 1000 (e.g., an electronic program guide). Users may use guides to identify available content. Instead of flipping through channels, some users may choose to scroll through a guide that shows additional information about the various pieces of content.

When a user presses a "guide" button on a remote control, the guide 1000 of FIG. 10 may be displayed. The guide 1000 may illustrate which piece of content is currently active (e.g., being broadcasted on a selected channel) by highlighting a portion of the guide. Referring to FIG. 10, a user may select a program called "The Office" being broadcasted on logical channel 4, and therefore, it may appear highlighted within the guide 1000. While "The Office" is selected, the guide 1000 may provide summary information 1001 regarding the particular episode of "The Office." The guide 1000 may also include a window 1002 for presenting the selected content being broadcast. As a user navigates the guide 1000, the content presented in the window 1002 may change to match the selected content. For example, if the user scrolls down from channel 4 to channel 5, the content presented in the window 1002 may change accordingly. Further, navigating through the guide 1000 may have similar effects that changing a channel would have as described above. That is, scrolling through the guide 1000 may be detected like a channel change in step 509 or step 903. Thus, scrolling through the guide 1000 may affect what content is buffered, and content presented in the window 1002 may be rewound if a buffered portion is available, may be from a recording on a DVR, or may be on-demand content as described above with respect to FIGS. 5A and 5B. Moreover, as a user navigates the guide 1000, the content presented in the window 1002 may be content received through a transmission session (e.g., an SDV session) if the user navigates to a channel at a commercial as described with respect to FIG. 9A. For example, if a commercial is being broadcasted on channel 5 when the user scrolls from channel 4 to channel 5, the window 1002 may present an SDV session including a portion of the primary content that was broadcasted before the commercial break.

Figure 11:
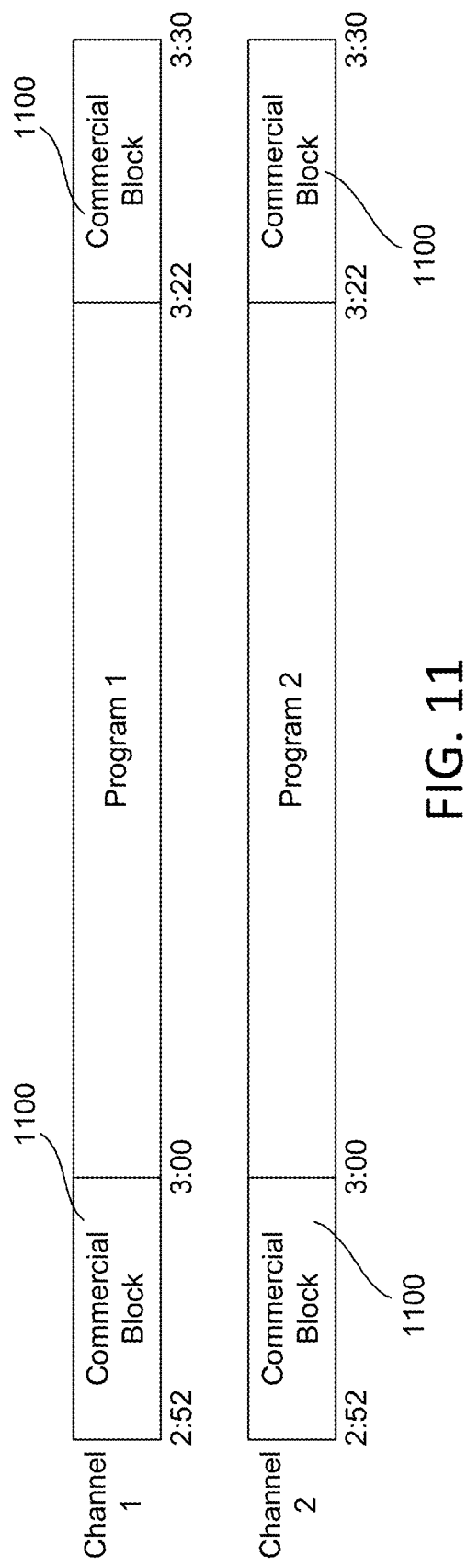
FIG. 11 is a diagram illustrating one or more aspects described herein.

FIG. 11 illustrates yet another aspect of the disclosure so that commercials can be avoided when a user first selects a channel. FIG. 11 illustrates how content for two different channels may be transmitted from a local office 103 to an interface 300. In the embodiment of FIG. 11, it is assumed that the interface 300 has at least two tuners and is configured to buffer a commercial block 1100 for each logical channel. In FIG. 11, each commercial block on channels 1 and 2 is eight minutes long. Thus, the interface 300 of FIG. 11 must be configured to buffer eight minutes of commercials for channel 1 and eight minutes of commercials for channel 2.

As shown in FIG. 11, the commercial blocks 1100 having the commercials to be presented during a program may be transmitted ahead of when the program is scheduled to be presented. Specifically, the commercial blocks for a program to be shown between 3:00 and 3:30 may be transmitted between 2:52 and 3:00. The interface 300 may buffer the commercial blocks 1100 and control when to present the commercials within the program. That is, the interface 300 may interrupt the program according to some schedule to insert the commercials from the commercial block that it buffered for that program. When the interface 300 interrupts the program to insert commercials, it may buffer the part of the program that is being broadcasted at that time so that that portion can be presented to the user when the inserted commercial finishes.

Because the interface may have control over when commercials are inserted, the interface 300 can refrain from inserting the commercials when a user first selects the channel. For example, if a user selects Program 2 on channel 2 at 3:10 (10 minutes into Program 2 which started at 3:00), the interface 300 may choose to delay presenting a commercial at that time even if a commercial would normally be shown during that time. Instead, the interface 300 may choose to insert the commercial after the user has been consuming Program 2 for some predetermined period of time (e.g., 2 minutes). Where a user selects a program after it is half over, then the user might only be presented with half of the commercials. Further, if the interface 300 has a tuner and pause buffer for each channel, then the interface 300 may prevent a user from having to view a commercial when each channel is selected.

In some embodiments, rather than buffer commercial blocks 1100 prior to the start of a program, the interface 300 may be configured to interrupt the program with a transmission session (e.g., an SDV session or unicast communication) to present commercials. In such embodiments, the interface 300 may buffer the content being interrupted so that when the transmission session (SDV session or unicast communication) presenting the commercial ends, the interface 300 can display the buffered content. Thus, similar to the embodiment of FIG. 11, the interface 300 can control when content is interrupted to keep users from having to consume content when they first select a channel.

Although example embodiments are described above, the various features and steps may be combined, divided, omitted, and/or augmented in any desired manner, depending on the specific secure process desired. For example, the process of FIG. 5B may be modified so that step 512 to check whether content is available on a DVR is not performed, and thus, a no determination at step 511 may proceed to step 514. Or, for example, the process of FIG. 9B may be modified such that only one or more of steps 921-925 are options. This patent should not be limited to the example embodiments described, but rather should have its scope determined by the claims that follow.

We claim:

1. A method, comprising:
    using a first pause buffer to record a first portion of first content being carried on a first logical channel and simultaneously using a second pause buffer to record a second portion of second content being carried on a second logical channel different from the first logical channel;
    determining, by a computing device, a channel change from the first logical channel to the second logical channel;
    in response to determining the channel change, determining whether the second logical channel is at a commercial break at a time of the channel change; and
    in response to determining that the second logical channel is at the commercial break, outputting the second portion of the second content, wherein the second portion comprises a portion of the second content before the commercial break.

2. The method of claim 1, further comprising:
    determining a second channel change from the second logical channel to a third logical channel;
    in response to determining the second channel change, determining whether a third pause buffer exists for the third logical channel; and
    in response to determining that the third pause buffer does not exist for the third logical channel, determining whether a third portion of third content being carried by the third logical channel is available as on-demand content.

3. The method of claim 2, wherein determining whether the third portion of the third content being carried by the third logical channel is available as on-demand content comprises comparing a program identifier of the third portion of the third content with a list of program identifiers corresponding to a list of content available as on-demand content.

4. The method of claim 1, further comprising:
    determining a second channel change from the second logical channel to a third logical channel;
    in response to determining the second channel change, determining whether a third pause buffer exists for the third logical channel; and
    in response to determining that the third pause buffer does not exist for the third logical channel, determining whether a third portion of third content being carried by the third logical channel is available on a digital video recorder.

5. The method of claim 4, wherein determining whether the third portion of the third content being carried by the third logical channel is available on the digital video recorder comprises polling a remotely located digital video recorder to determine whether the remotely located digital video recorder has recorded the third portion of the third content.

6. The method of claim 1, further comprising:
    determining, based on a number of tuners of the computing device, a number of logical channels to record using a pause buffer.

7. The method of claim 1, further comprising determining lengths of the first pause buffer and the second pause buffer based on a number of tuners being used for pause buffering.

8. The method of claim 1, further comprising determining lengths of the first pause buffer and the second pause buffer based on user preferences.

9. The method of claim 1, wherein a length of the first pause buffer is greater than a length of the second pause buffer.

10. A method, comprising:
   simultaneously buffering a first portion of first content output on a first logical channel and buffering a second portion of second content output on a second logical channel different from the first logical channel;
   receiving, by a computing device, a signal requesting a change from the first logical channel to the second logical channel;
   determining whether there is a commercial block on the second logical channel in response to the receiving the signal; and
   in response to determining that there is a commercial block on the second logical channel, establishing a transmission session, between the computing device and an interface at a remote premise or a device associated with the interface, for providing the second portion of the second content, wherein the second portion comprises a segment of the second content before the commercial block.

11. The method of claim 10, further comprising:
   prior to the buffering the second portion of the second content, determining that the second logical channel is approaching the commercial block; and
   initiating the buffering the second portion of the second content in response to the determining that the second logical channel is approaching the commercial block.

12. The method of claim 11, wherein the buffering the second portion of the second content comprises buffering a portion of the second content to be presented during a set period of time prior to the commercial block.

13. The method of claim 10,
   wherein the determining whether there is the commercial block on the second logical channel comprises analyzing the second content output on the second logical channel, and
   wherein the establishing the transmission session comprises establishing a switched digital video transmission session.

14. The method of claim 13, further comprising providing, to the interface, the second portion of the second content, wherein the segment occurs during a set period of time prior to the commercial block.

15. The method of claim 13, wherein the signal comprises a request for the switched digital video transmission session.

16. A method, comprising:
   simultaneously buffering, in a first buffer, first content provided on a first logical channel and buffering, in a second buffer, second content provided on a second logical channel different from the first logical channel;
   receiving, at a computing device, a request to change channels from the first logical channel to the second logical channel;
   determining whether the second logical channel is providing a commercial break at a time of receiving the request; and
   in response to determining that the second logical channel is providing the commercial break at the time of receiving the request, outputting a portion of the second content from the second buffer, wherein the portion starts at a predetermined period of time preceding the commercial break.

17. The method of claim 16, wherein the outputting comprises:
   providing a switched digital video session comprising the portion of the second content; and
   continuing the switched digital video session until a subsequent channel change occurs or the portion of the second content ends.

18. The method of claim 17, wherein the switched digital video session provides the portion of the second content at a faster playback rate than that of the second logical channel.

19. The method of claim 16,
   wherein the outputting comprises providing a switched digital video session comprising the portion of the second content, and
   wherein the method further comprises:
      terminating the switched digital video session when the portion of the second content ends; and
      in response to the terminating, switching to the second logical channel to output a remaining portion of the second content.

20. The method of claim 1, further comprising:
   after the outputting the second portion of the second content, outputting, from the second pause buffer, the commercial break and a remaining portion of the second content.

21. The method of claim 10, wherein the receiving the signal comprises receiving the signal from the interface.

* * * * *